(12) United States Patent
Fukushima

(10) Patent No.: US 7,159,703 B2
(45) Date of Patent: *Jan. 9, 2007

(54) CLUTCH DEVICE HAVING AN ELASTIC COUPLING FOR A FLYWHEEL

(75) Inventor: Hirotaka Fukushima, Hirakata (JP)

(73) Assignee: Exedy Corporation, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/819,922

(22) Filed: Apr. 8, 2004

(65) Prior Publication Data

US 2004/0211640 A1   Oct. 28, 2004

(30) Foreign Application Priority Data

Apr. 23, 2003   (JP)   ............................. 2003-119045

(51) Int. Cl.
  *F16F 15/30*   (2006.01)
(52) U.S. Cl. ............... 192/70.17; 192/30 V; 192/214.1
(58) Field of Classification Search ............. 192/70.17, 192/30 V, 212, 214, 214.1, 107 R
See application file for complete search history.

(56) References Cited

U.S. PATENT DOCUMENTS 4,844,224 A * 7/1989 Fukushima .............. 192/70.17
5,622,245 A * 4/1997 Reik et al. .................. 192/55.1
5,979,623 A * 11/1999 Yamamoto ................ 192/30 V
6,401,897 B1 * 6/2002 Jackel et al. ............. 192/70.13
6,481,552 B1 * 11/2002 Fukushima .............. 192/70.17

FOREIGN PATENT DOCUMENTS

| DE | 3515928 A1 | 11/1986 |
| DE | 19620698 A1 | 9/1997 |
| JP | 10-231897 | 9/1998 |
| JP | 2001 140928 | * 5/2001 |

* cited by examiner

*Primary Examiner*—Saul Rodriguez
(74) *Attorney, Agent, or Firm*—Global IP Counselors, LLP

(57) ABSTRACT

In a clutch device 1, a clutch cover assembly 8 is attached to a second flywheel assembly 5 to bias elastically a frictional connection portion 54 against a friction surface 21a of a flywheel 21. A release device 10 releases the bias toward the frictional connection portion 54 by applying a load to the clutch cover assembly 8 in an axial direction toward the engine. A support plate 39 elastically supports the second flywheel assembly 5 such that the second flywheel assembly 5 can move in a bending direction. A bending direction movement suppression mechanism 24 suppresses bending movement of the second flywheel 5 by connecting the second flywheel assembly 5 to a disk-like member 13 when the clutch cover assembly 8 receives a load toward the engine in the axial direction.

20 Claims, 23 Drawing Sheets

CLUTCH DEVICE HAVING AN ELASTIC COUPLING FOR A FLYWHEEL

BACKGROUND OF THE INVENTION

1. Field of the Invention

The invention relates to a clutch device having a flywheel. More specifically, the present invention relates to a clutch device, in which the flywheel has a friction surface to facilitate clutch coupling to a frictional coupling portion of a clutch disk assembly.

2. Background Information

Conventionally, a flywheel is attached to a crankshaft of an engine for absorbing vibrations caused by variations in engine combustion. Further, a clutch device is arranged on a transmission side (i.e., in a position axially shifted toward the transmission) with respect to the flywheel. The clutch device usually includes a clutch disk assembly coupled to an input shaft of the transmission and a clutch cover assembly for biasing the frictional coupling portion of the clutch disk assembly toward the flywheel. The clutch disk assembly typically has a damper mechanism for absorbing and damping torsional vibrations. The damper mechanism has elastic members such as coil springs arranged for compression in a rotating direction.

A structure is also known in which the damper mechanism is not arranged in the clutch disk assembly, and rather is arranged between the flywheel and the crankshaft. In this structure, the flywheel is located on the output side of a vibrating system, in which the coil springs form a border between the output and input sides, so that an inertia on the output side is larger than that in other prior art. Consequently, the resonance rotation speed can be lower than an idling rotation speed so that damping performance is improved. The structure, in which the flywheel and the damper mechanism are combined as described above, provides a flywheel assembly and/or a flywheel damper.

In the flywheel assembly, an disk-like plate called "a flexible plate" is used to connect the flywheel to the crankshaft so that it is possible to decrease bending vibrations from the crankshaft. The flexible plate has a high rigidity in the rotating direction to transmit torque, but it has a low rigidity in the bending direction to deflect or bend in response to the bending vibrations, as shown in Unexamined Japanese Patent Publication H10-231897. When the engine is started or stopped, the rotational speed passes through a resonance point of bending vibration in a low speed range (for example, below 500 rpm). At this time, the bending vibrations become large so that the flexible plate is damaged or sound and vibration become violent.

SUMMARY OF THE INVENTION

It is an object of the present invention to suppress bending vibration in the low speed range by a simple device and/or structure, in a clutch device having a flywheel that is connected to the input shaft of the transmission through the clutch disk assembly and so on.

According to a first aspect of the present invention, a clutch device to transmit and stop torque from a crankshaft of an engine to a transmission includes a flywheel, a damper mechanism, a clutch disk assembly, a clutch cover assembly, a release device, a bending direction support mechanism, and a bending direction movement suppression mechanism. The flywheel is movable in an axial direction relative to the crankshaft within a certain range, and has a friction surface on an axial side opposite to the engine. The damper mechanism elastically connects the flywheel with the crankshaft and includes elastic members. The clutch disk assembly has a frictional connection portion adjacent to the friction surface of the flywheel. The clutch cover assembly is attached to the flywheel to bias elastically the frictional connection portion against the friction surface of the flywheel. The release device releases the bias toward the frictional connection portion by applying a load to the clutch cover assembly in the axial direction toward the engine. The bending direction support mechanism elastically supports the flywheel such that the flywheel can move in the bending direction. Further, the flywheel can tilt relative to the axial center line. The bending direction movement suppression mechanism suppresses the bending movement of the flywheel by connecting the flywheel to a crankshaft side member when the clutch cover assembly receives the load toward the engine in the axial direction.

In this clutch device, when the release device releases the clutch by applying a load to the clutch cover assembly, the bending direction vibration suppression mechanism presses the flywheel against the crankshaft side member (for example, the crankshaft or the other member fixed to the crankshaft) by making use of the load. Consequently, the bending direction support mechanism is unlikely to operate when the clutch is released, thereby suppressing the resonance.

A clutch device in accordance with a second aspect of the present invention is the device of the first aspect, wherein the bending direction movement suppression mechanism presses the flywheel against the crankshaft side member by making use of the load from the release device to the clutch cover assembly toward the engine in the axial direction. In this clutch device, the bending vibration suppression mechanism presses the flywheel against the crankshaft side member from the transmission side in the axial direction when the release device applies a load to the crankshaft toward the engine in the axial direction. Since the lock of the bending vibration support is realized by the load from the release device when releasing, a simple structure for the clutch device is realized.

A clutch device in accordance with a third aspect of the present invention is the device of the second aspect, wherein the bending direction movement suppression mechanism is fixed to the crankshaft, and includes a lock member which functions as the crankshaft side member.

A clutch device in accordance with a fourth aspect of the present invention is the device of the third aspect, wherein the lock member is a disk-like member.

A clutch device in accordance with a fifth aspect of the present invention is the device of the fourth aspect, wherein the bending direction movement suppression mechanism further includes a friction member disposed between the flywheel and the lock member. In this clutch device, the bending vibration suppression mechanism presses the flywheel against the crankshaft side member from the transmission side in the axial direction when the release device applies the load to the clutch cover assembly toward the engine in the axial direction. Then, the friction member is sandwiched or interposed between the flywheel and the crankshaft side member to connect frictionally both of the members. The friction member functions as a member to soften a shock when the flywheel is frictionally engaged with the crankshaft side member. The friction member may be fixed to either one of the flywheel and the lock member. The fiction member may also be fixed to neither member.

A clutch device in accordance with a sixth aspect of the present invention is the device of any one the first to fifth aspects, wherein the flywheel is composed of a flywheel main body formed with the friction surface and an contact member disposed on an axial side of the flywheel main body toward the engine. The clutch device further includes a friction generating mechanism held by the flywheel main body via the contact member, to generate frictional resistance when the flywheel rotates relative to the crankshaft.

In this clutch device, the contact member has a function of holding the friction generating mechanism on the flywheel main body so that the number of components is small and the structure of the clutch device is simpler than those of conventional clutch devices.

A clutch device in accordance with a seventh aspect of the present invention is the device of the sixth aspect, wherein the contact member has a fix portion fixed to the flywheel main body and a contact portion to contact the crankshaft side member. The friction generating mechanism is disposed between the contact portion and the flywheel main body. In this clutch device, since the friction generating mechanism is disposed between the contact portion of the contact member and the flywheel main body, the space for the frictional generating mechanism is reduced.

A clutch device in accordance with a eighth aspect of the present invention is the device of the sixth or seventh aspect, wherein the contact member further has a support portion to support elastic members of the damper mechanism in the rotational direction. In this clutch device, the contact member has the support portion for the elastic member, so that the number of the components is small and the structure of the clutch device is simpler than those of conventional clutch devices.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

(1) Structure

Figure 1:
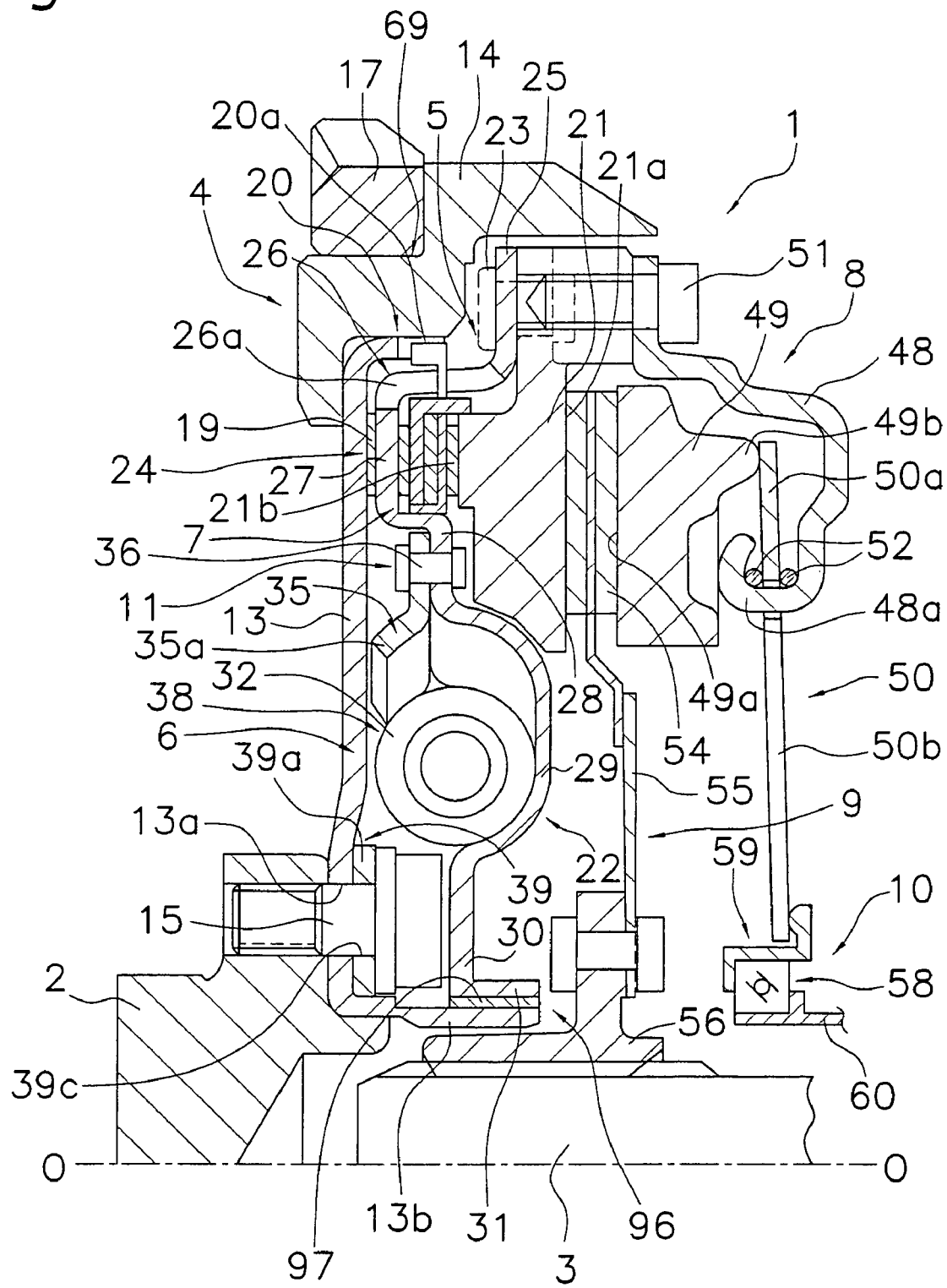
FIG. 1 is a schematic cross-sectional view of a clutch device in accordance with a preferred embodiment of the present invention.
Figure 2:
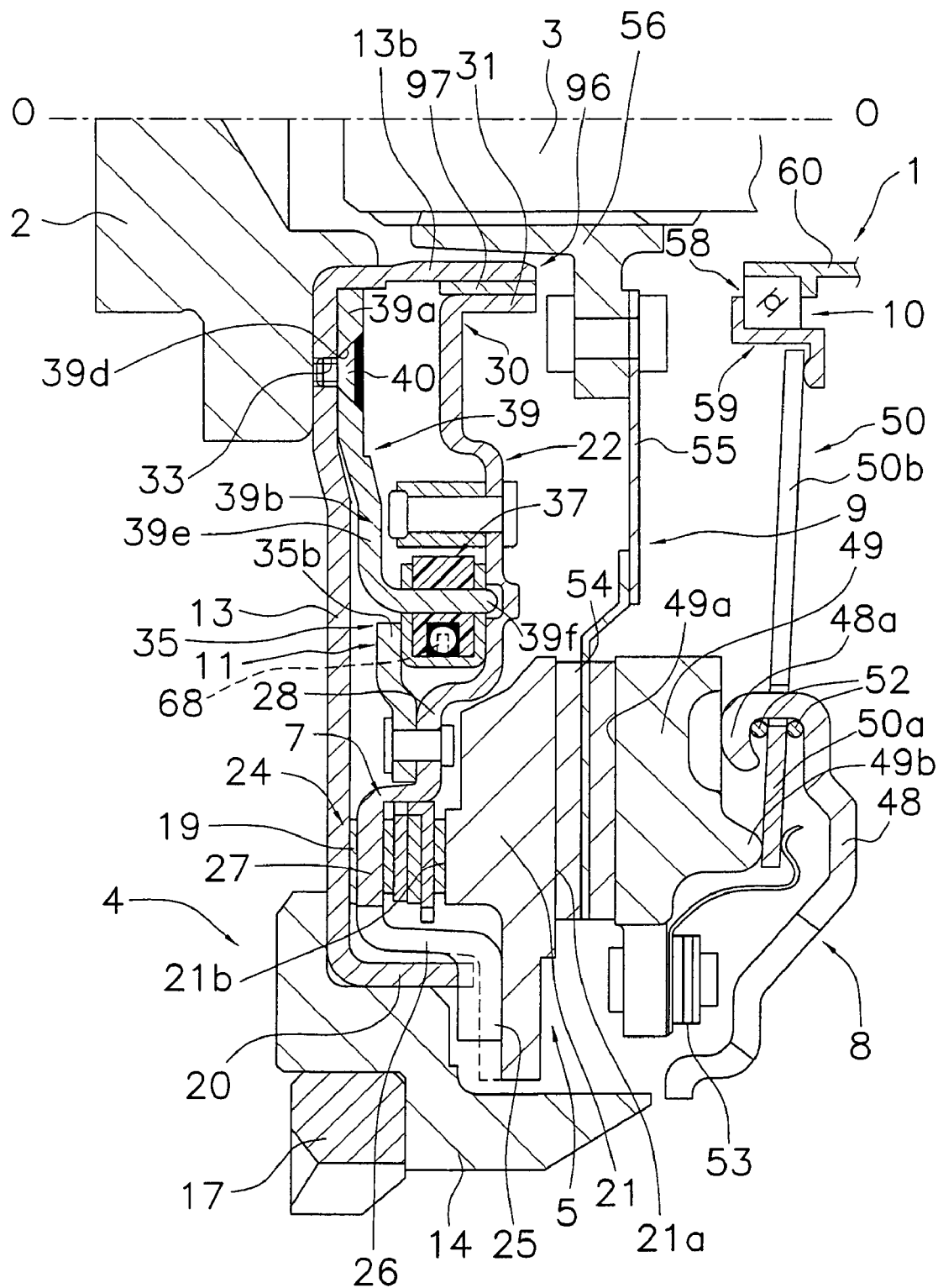
FIG. 2 is an alternate schematic cross-sectional view of the clutch device of FIG. 1.

Referring initially to FIGS. 1 and 2, a clutch device 1 in accordance with a preferred embodiment of the present invention is primarily formed of a first flywheel assembly 4, a second flywheel assembly 5, a clutch cover assembly 8, a clutch disk assembly 9, and a release device 10. The first and second flywheel assemblies 4 and 5 are combined to form a flywheel damper 11 including a damper mechanism 6.

An engine (not shown) is arranged on the left side in FIGS. 1 and 2, and a transmission (not shown) is arranged on the right side. The clutch device 1 is a device that releasably transmits a torque between a crankshaft 2 on the engine side and an input shaft 3 on the transmission side.

The first flywheel assembly 4 is fixed to an end of the crankshaft 2. The first flywheel assembly 4 is a member that ensures a large moment of inertia on the crankshaft side. The first flywheel assembly 4 is primarily formed of a disk-like member (crankshaft side member and lock member) 13, an annular member 14, and a support plate 39, which will be described later. The disk-like member 13 has a radially inner end fixed to an end of the crankshaft 2 by a plurality of bolts 15. The disk-like member 13 has bolt insertion apertures 13a in locations respectively corresponding to the bolts 15. Each bolt 15 is preferably axially attached to the crankshaft 2 from the transmission side. The annular member 14 is preferably axially fixed to the radially outer end of the disk-like member 13, and has a relatively thick block-like form. The annular member 14 preferably extends toward the transmission side relative to the disk-like member 13. Portions of the annular member 14, however, preferably contact the radially outer end of the disk-like member 13 at a radially outermost portion and a radially outer engine side portion. The radially outer end of the disk-like member 13 is preferably welded to the annular member 14. Further, a ring gear 17 for an engine starter is fixed to an outer peripheral surface of the annular member 14. The first flywheel assembly 4 may be formed of an integral or unitary member.

Figure 4:
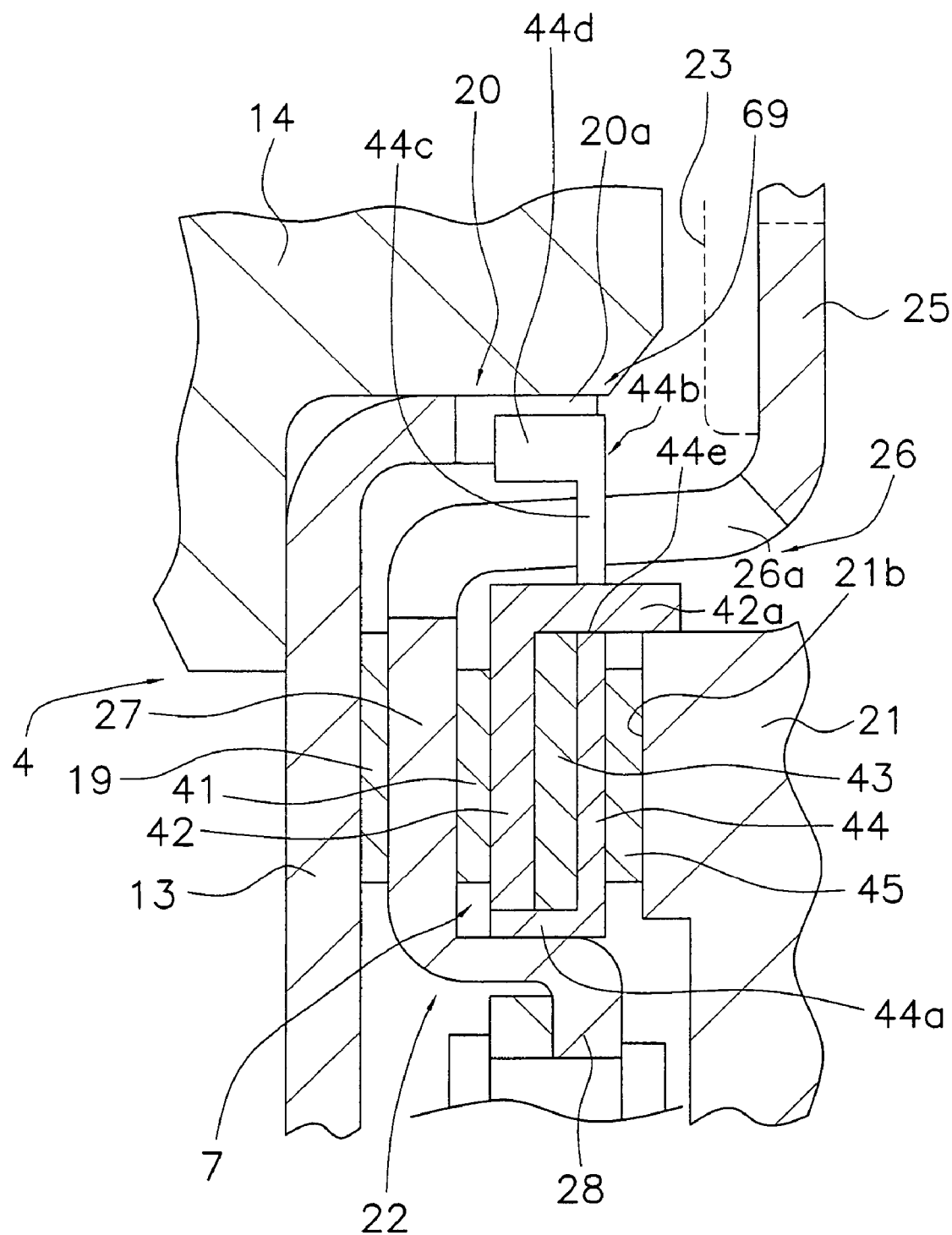
FIG. 4 is an enlarged fragmentary cross-sectional view that particularly illustrates a frictional resistance generating mechanism of the clutch device of FIG. 1.
Figure 6:
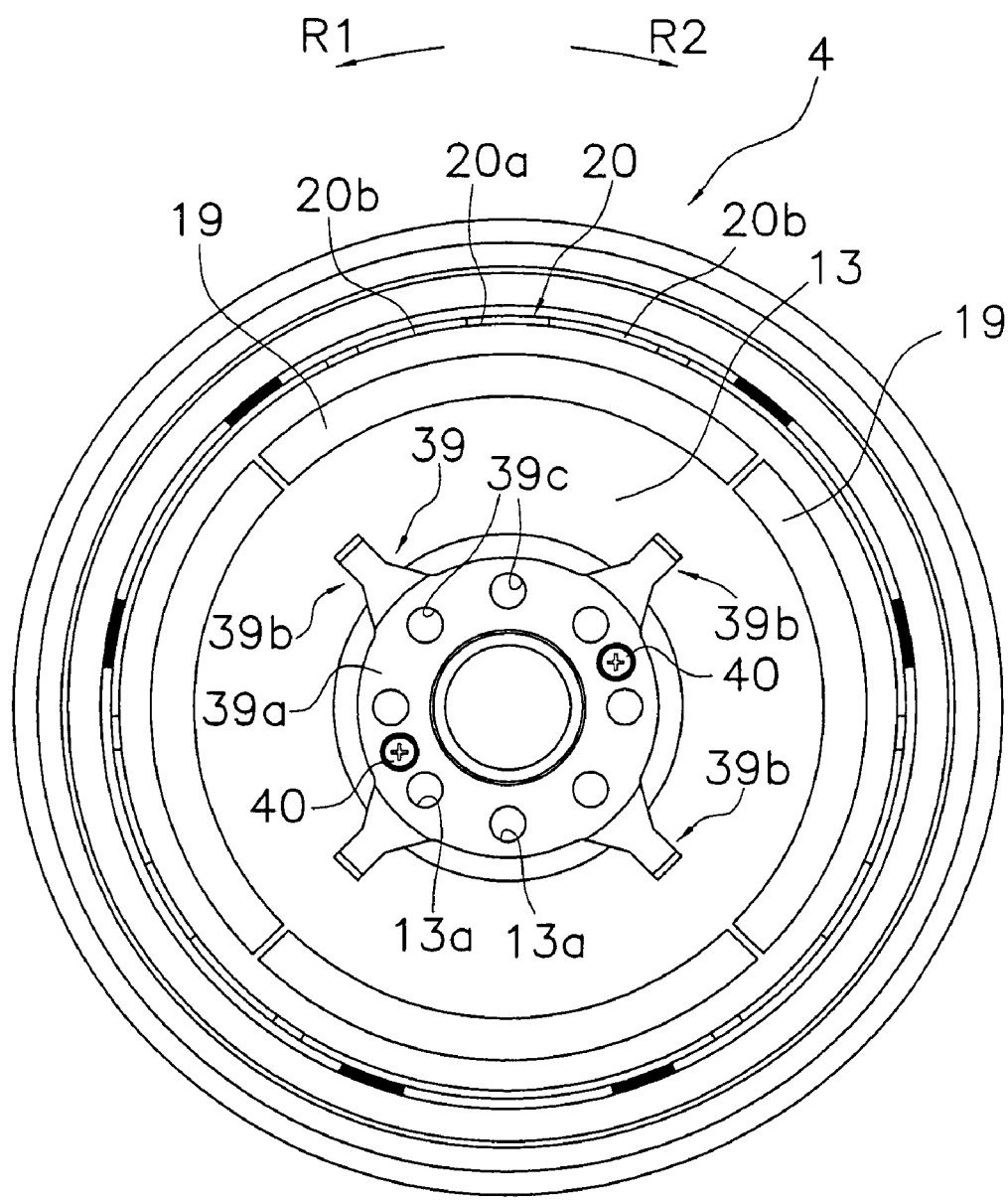
FIG. 6 is an elevational view of a first flywheel of the clutch device of FIG. 1.
Figure 7:
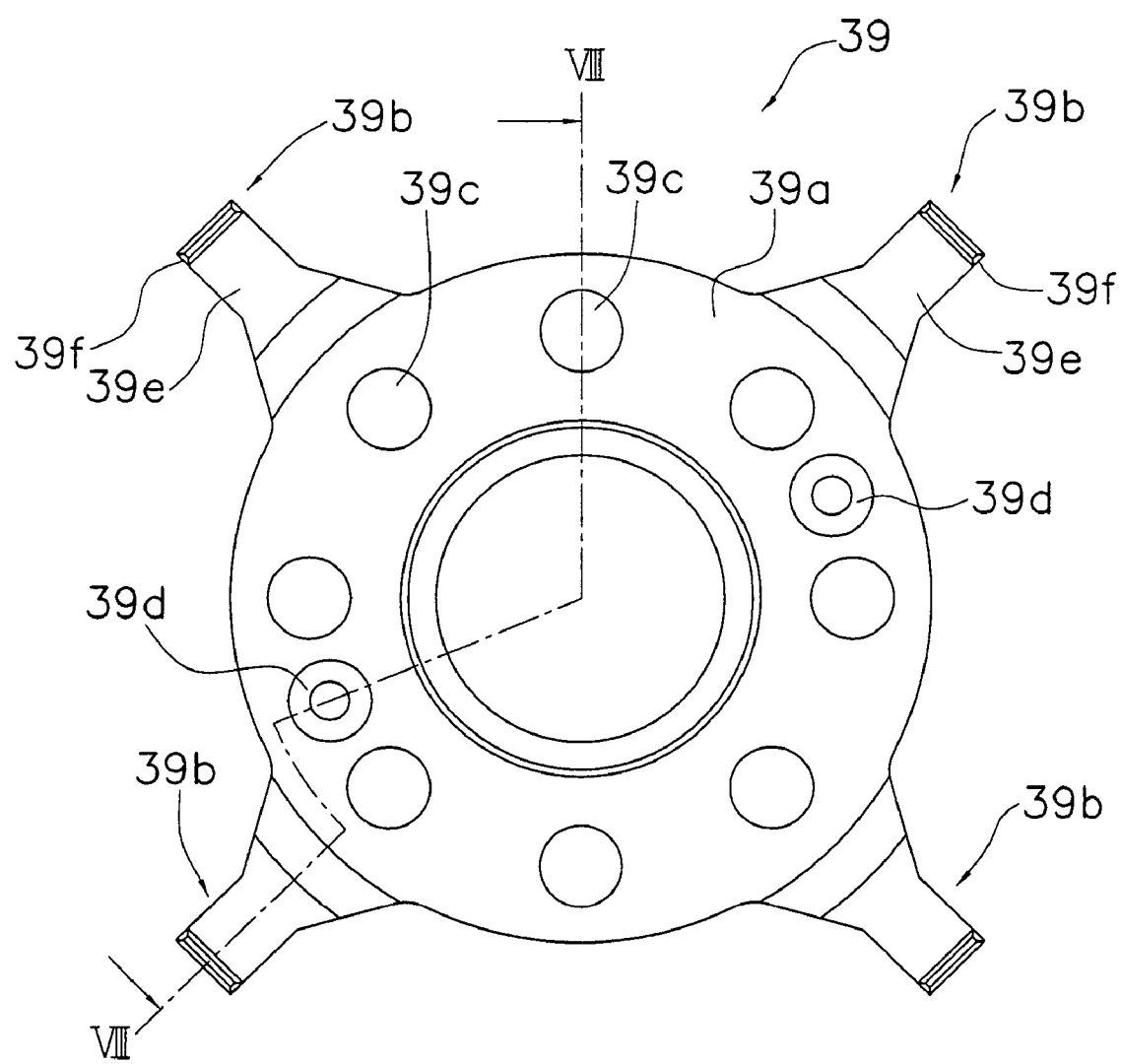
FIG. 7 is an elevational view of a support plate for the first flywheel.
Figure 8:
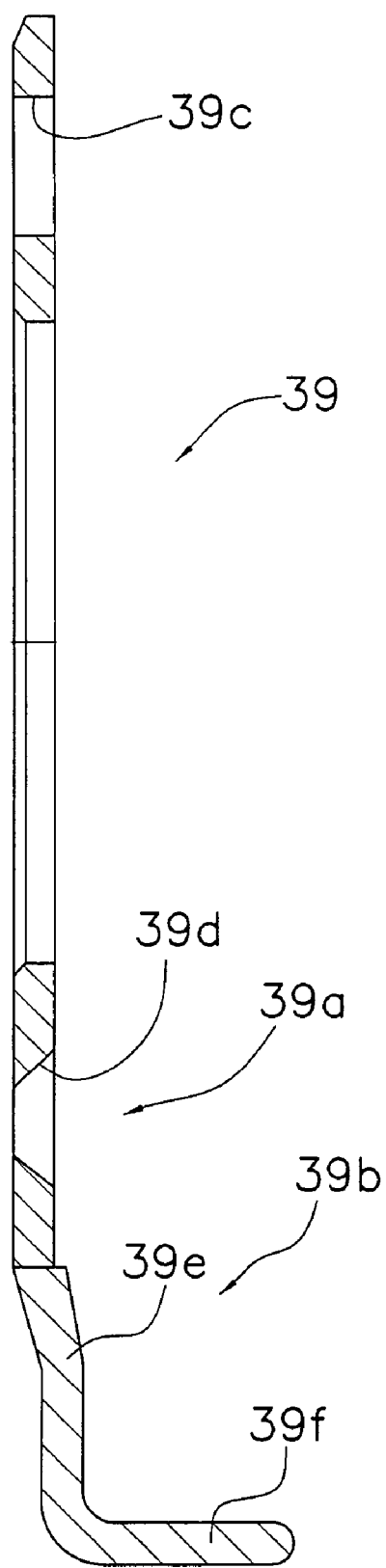
FIG. 8 is a cross-sectional view of the support plate taken along line segments and arc labelled VIII—VIII in FIG. 7.

A structure of the radially outer portion of the disk-like member 13 will now be described in greater detail. As shown in FIG. 4, a radially outer portion of the disk-like member 13 has a flat form, and a friction member 19 is affixed to its surface on the transmission side in the axial direction. As shown in FIG. 6, the friction member 19 is formed of a plurality of arc-shaped members, and has an annular form as a whole. The friction member 19 functions to dampen shock when the first and second flywheel assemblies 4 and 5 are coupled together. The friction member 19 also serves to stop the relative rotation early in the coupling operation. Alternatively, the friction member 19 may be fixed to a disk-like plate (contact member) 22.

Figure 9:
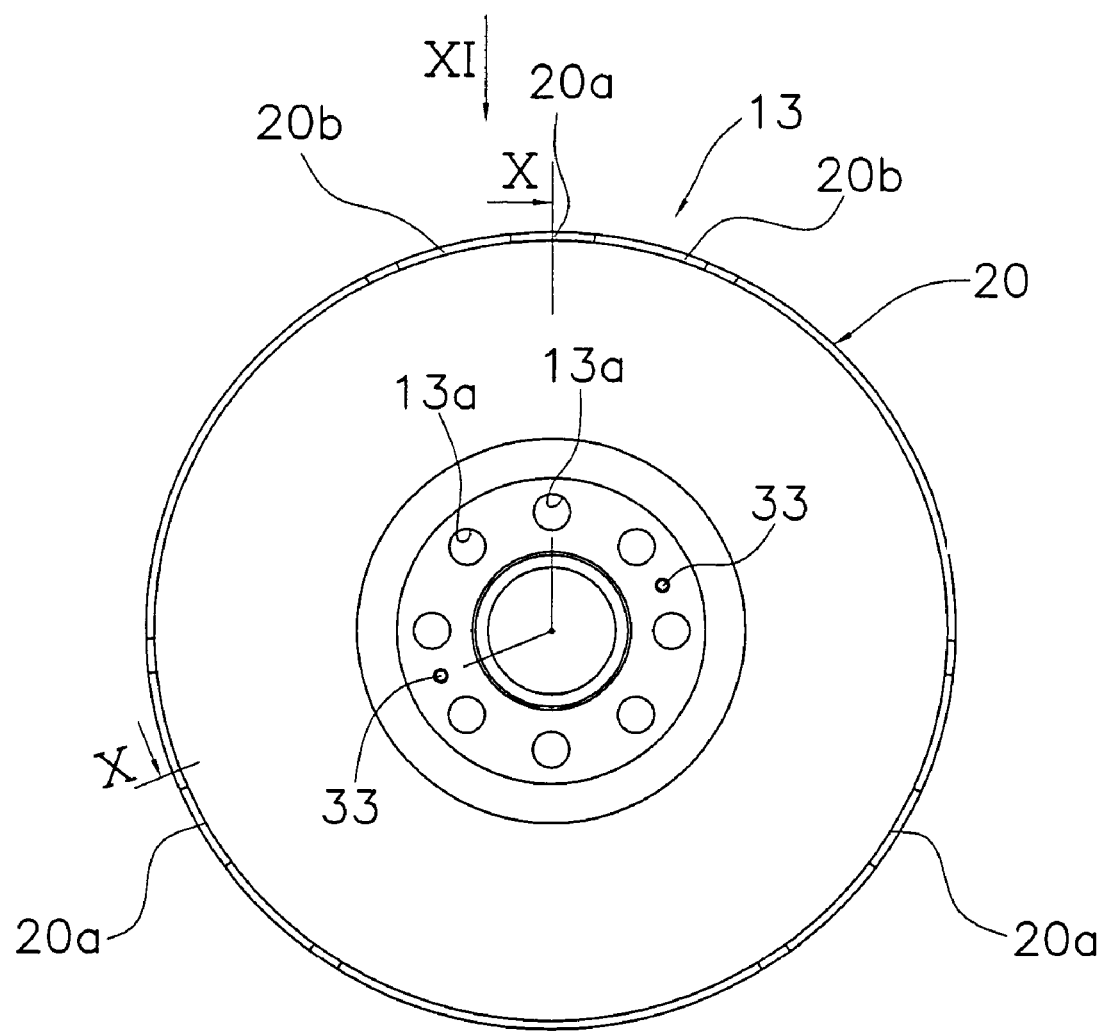
FIG. 9 is an elevational view of a disk-like member of the clutch device of FIG. 1.
Figure 10:
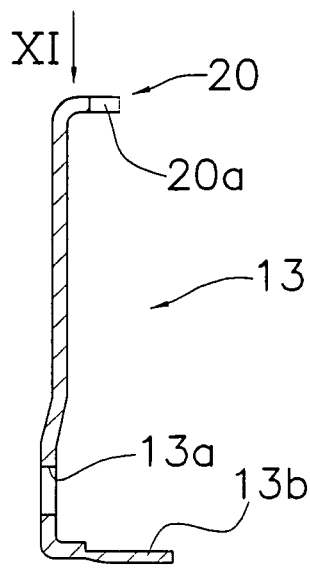
FIG. 10 is a cross-sectional view of the disk-like member taken along angle X—X in FIG. 9.
Figure 10:
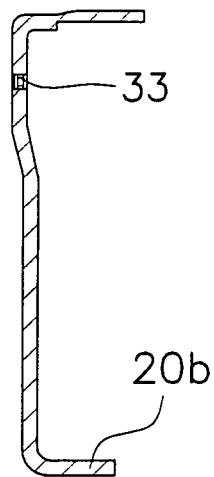
Figure 11:
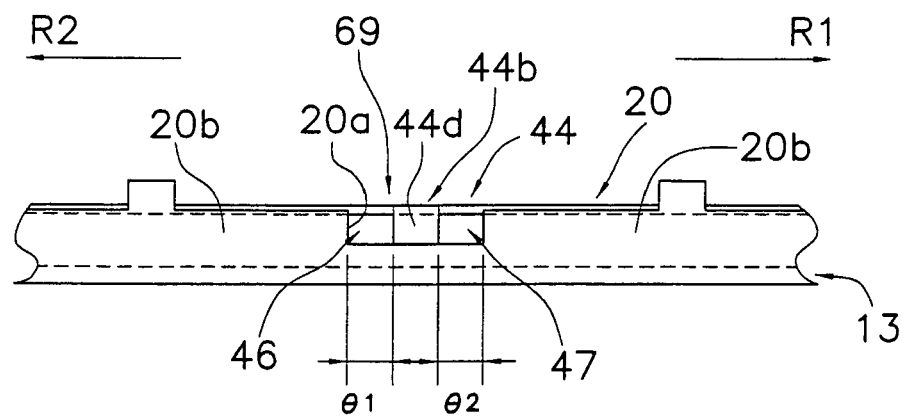
FIG. 11 is a fragmentary plan view of the disk-like member viewed in a direction along ray XI in FIGS. 9 and 10.
Figure 12:
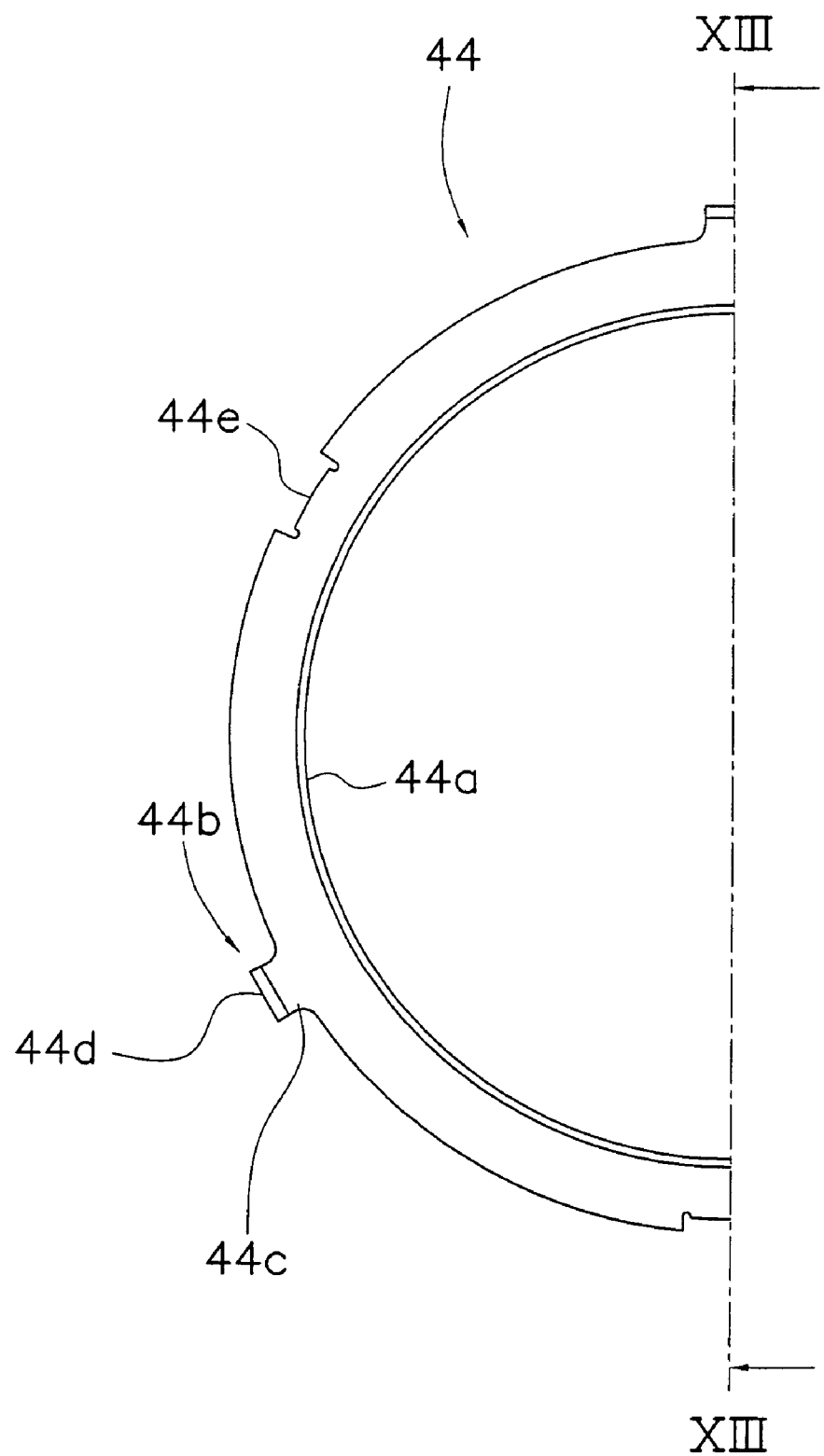
FIG. 12 is a fragmentary elevational view of a second friction plate of the clutch device of FIG. 1.
Figure 13:
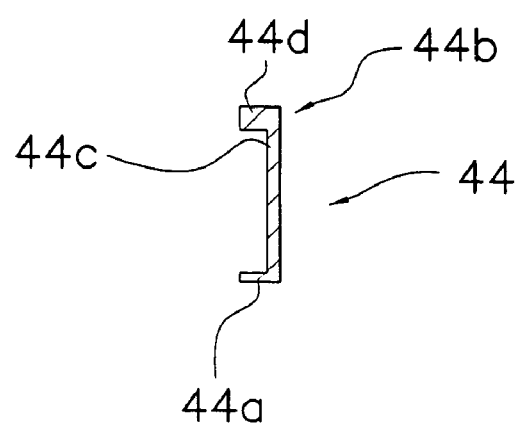
FIG. 13 is a cross-sectional view of the second friction plate taken along line XIII—XIII in FIG. 12.
Figure 13:

As shown in FIGS. 9–11, the disk-like member 13 is provided at its outer periphery with a cylindrical portion 20 extending axially toward the transmission. The cylindrical portion 20 is supported on the inner peripheral surface of the annular member 14, and is provided at its end with a plurality of recesses 20a. Each recess 20a has a predetermined angular length in the rotating direction, and functions as a part of a rotating-direction engaging portion 69 as described later. Each recess 20a is defined in the rotating direction between the opposite portions, which can be considered as axial claws 20b of the cylindrical portion 20.

Referring again to FIGS. 1 and 2, the second flywheel assembly 5 is primarily formed of a flywheel (flywheel main body) 21 with a friction surface, and the disk-like plate 22. Thus, a flywheel of the present invention can include the flywheel 21 and the disk-like plate 22. The flywheel 21 with the friction surface has an annular and disk-like form, and is axially located on the transmission side with respect to the outer peripheral portion of the first flywheel assembly 4. The flywheel 21 with the friction surface is provided on its transmission side with a first friction surface 21a. The first friction surface 21a is an annular and flat surface, and can be coupled to the clutch disk assembly 9, which will be described later. The flywheel 21 with the friction surface is further provided on its engine side with a second friction surface 21b being part of and on a contact member that extends toward the engine. The second friction surface 21b is an annular and flat surface, and functions as a frictional sliding surface of a frictional resistance generating mechanism 7, which will be described later. When compared to the first friction surface 21a, the second friction surface 21b preferably has a slightly smaller outer diameter and a significantly larger inner diameter. Accordingly, the second friction surface 21b has a larger effective radius than the first friction surface 21a. The second friction surface 21b is axially opposed to the friction member 19.

Figure 5:
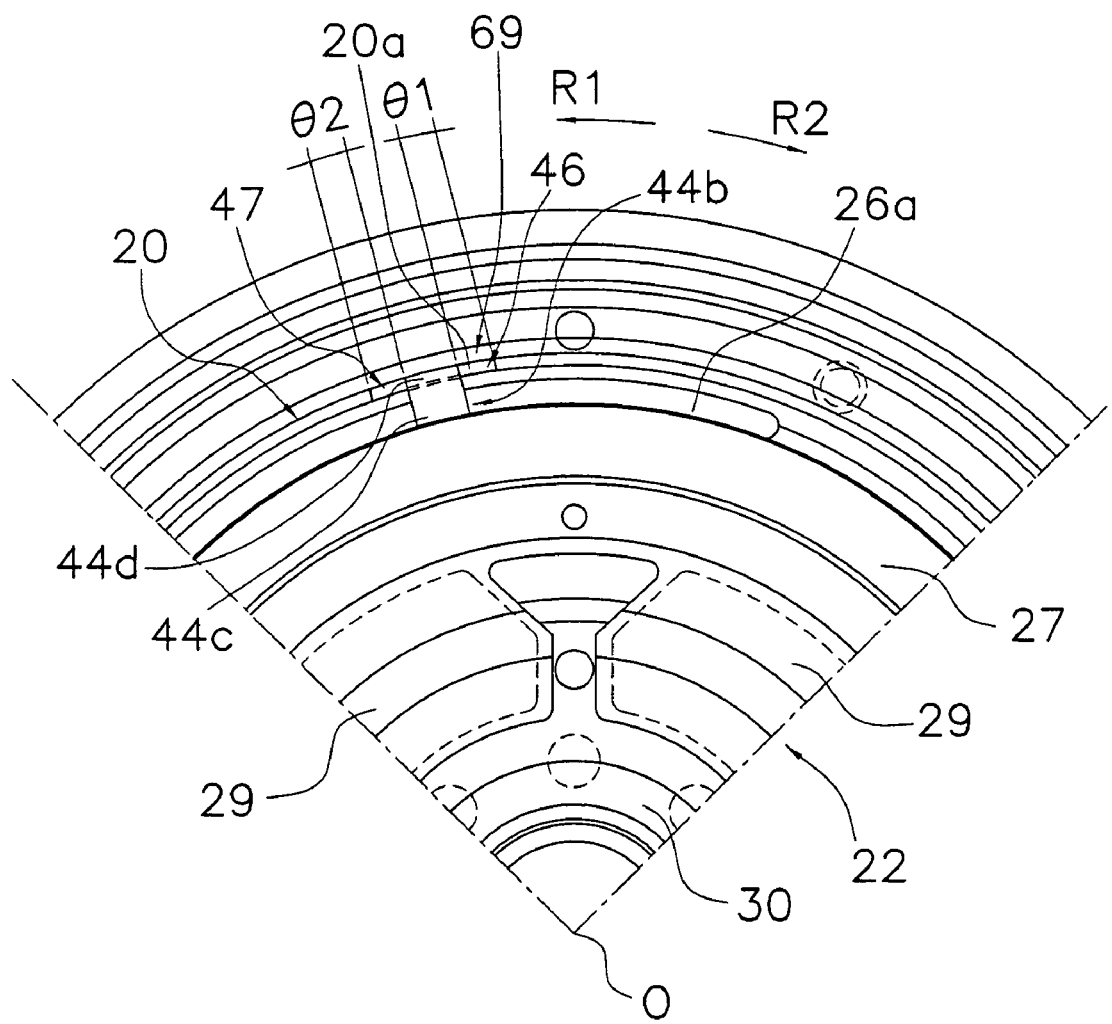
FIG. 5 is an enlarged fragmentary elevational view that particularly illustrates the frictional resistance generating mechanism of the clutch device of FIG. 1.

Description will now be given on the disk-like plate 22. The disk-like plate 22 is arranged axially between the first flywheel assembly 4 and the flywheel 21 having the friction surface. The disk-like plate 22 has a radially outer portion fixed to a radially outer portion of the flywheel 21 having the friction surface by a plurality of rivets 23, and functions as a member rotating together with the flywheel 21 having the friction surface. More specifically, the disk-like plate 22 is formed of a radially outer fixing portion (fix portion) 25, a cylindrical portion 26, a contact portion 27, a coupling portion 28, a spring support portion 29, a radially inner portion 30, and a radially inner cylindrical portion 31, which are aligned radially in this order. The radially outer fixing portion 25 is flat and is in axial contact with the engine side of the radially outer portion of the flywheel 21 having the friction surface. The radially outer fixing portion 25 is fixed to the flywheel 21 by the rivets 23 already described. The cylindrical portion 26 extends axially toward the engine from the inner periphery of the radially outer fixing portion 25, and is arranged on the radially inner side of the cylindrical portion 20 of the disk-like member 13. The cylindrical portion 26 is provided with a plurality of recesses 26a. As shown in FIG. 5, each recess 26a is formed corresponding to the recess 20a in the cylindrical portion 20, but is angularly long in the rotating direction. In the rotating direction, therefore, the opposite ends of each recess 26a are located outside the opposite ends of the corresponding recess 20a. Referring again to FIGS. 1 and 2, the contact portion 27 has a circular and flat form, and corresponds to the friction member 19. The contact portion 27 is axially opposed to the second friction surface 21b of the flywheel 21 having the friction surface with a space therebetween, and various members of the frictional resistance generating mechanism 7, to be described later, are arranged in this space. The frictional resistance generating mechanism 7 is arranged between the contact portion 27 of the disk-like plate 22 of the second flywheel assembly 5 and the flywheel 21 having the friction surface, so that the space required by the structure can be small. The coupling portion 28 is a flat portion located axially on the transmission side with respect to the contact portion 27, and a spring support plate 35 is fixed thereto as described later. The spring support portion 29 accommodates and supports the coil springs 32 of the damper mechanism 6. Since the disk-like plate 22 having the contact portion 27 also has the spring support portion 29, this structure allows a reduction in the number of parts, and simplifies the structure relative to the prior art.

A radially inner facing surface of the radially inner cylindrical portion 31 of the disk-like plate 22 is radially supported on a radially inner cylindrical portion 13b of the disk-like member 13, and is rotatable thereto. More specifically, a tubular bush 97 is fixed to a radially inner surface of the radially inner cylindrical portion 31. Further, a radially inner surface of the bush 97 is rotatably supported by a radially outer surface of the radially inner cylindrical portion 13b of the disk-like member 13. As mentioned above, the bush 97 and the radially inner cylindrical portion 13b compose a radial direction location positioning mechanism 96, which determines the radial position of the second flywheel assembly 5 relative to the first flywheel assembly 4. The bush 97 may be made of lubricant material or lubricant may be applied to the surface of the bush 97.

Description will now be given on the damper mechanism 6. The damper mechanism 6 elastically couples the crankshaft 2 to the flywheel 21 having the friction surface in the rotating direction. The damper mechanism 6 is formed of a high rigidity damper 38 including a plurality of coil springs 32, and the friction resistance generating mechanism 7. The damper mechanism 6 further includes a spring rotating-direction support mechanism (low rigidity damper) 37 to realize low rigidity characteristics in a small torsional torque region. The spring rotating-direction support mechanism 37 and the high rigidity damper 38 are located in series in the rotating direction in a torque transmission system.

Each coil spring 32 is preferably formed of a combination of large and small springs. Each coil spring 32 is accommodated in each of the spring support portions 29, and its radially opposite sides and transmission side in the axial direction are supported by the spring support portion 29. The spring support portion 29 also supports the opposite sides in the rotating direction. The spring support plate 35 is fixed to the coupling portion 28 of the disk-like plate 22 by rivets 36. The spring support plate 35 is an annular member, and is formed with spring support portions 35a to support axially an engine side of the radially outward portion of the springs 32.

Figure 3:
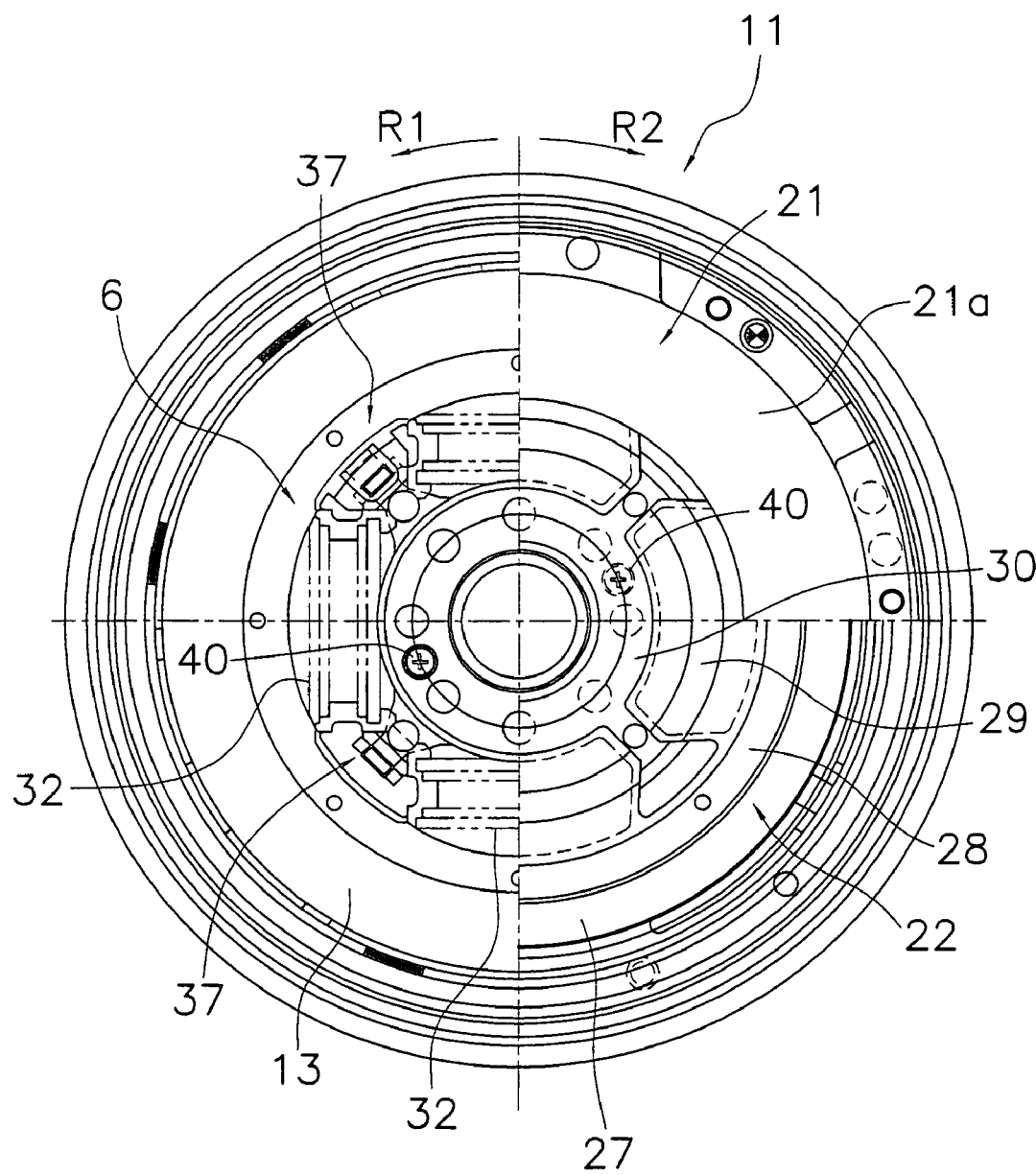
FIG. 3 is an elevational view of the clutch device of FIG. 1.

As shown in FIGS. 2 and 3, the spring rotating-direction support mechanism 37 is arranged circumferentially (i.e., in the rotating direction) between the neighboring coil springs 32, and is movable in the rotating direction while being held axially between the disk-like plate 22 and the spring support plate 35. Each spring rotating-direction support mechanism 37 substantially has a block form, and has an axial through aperture.

Figure 16:
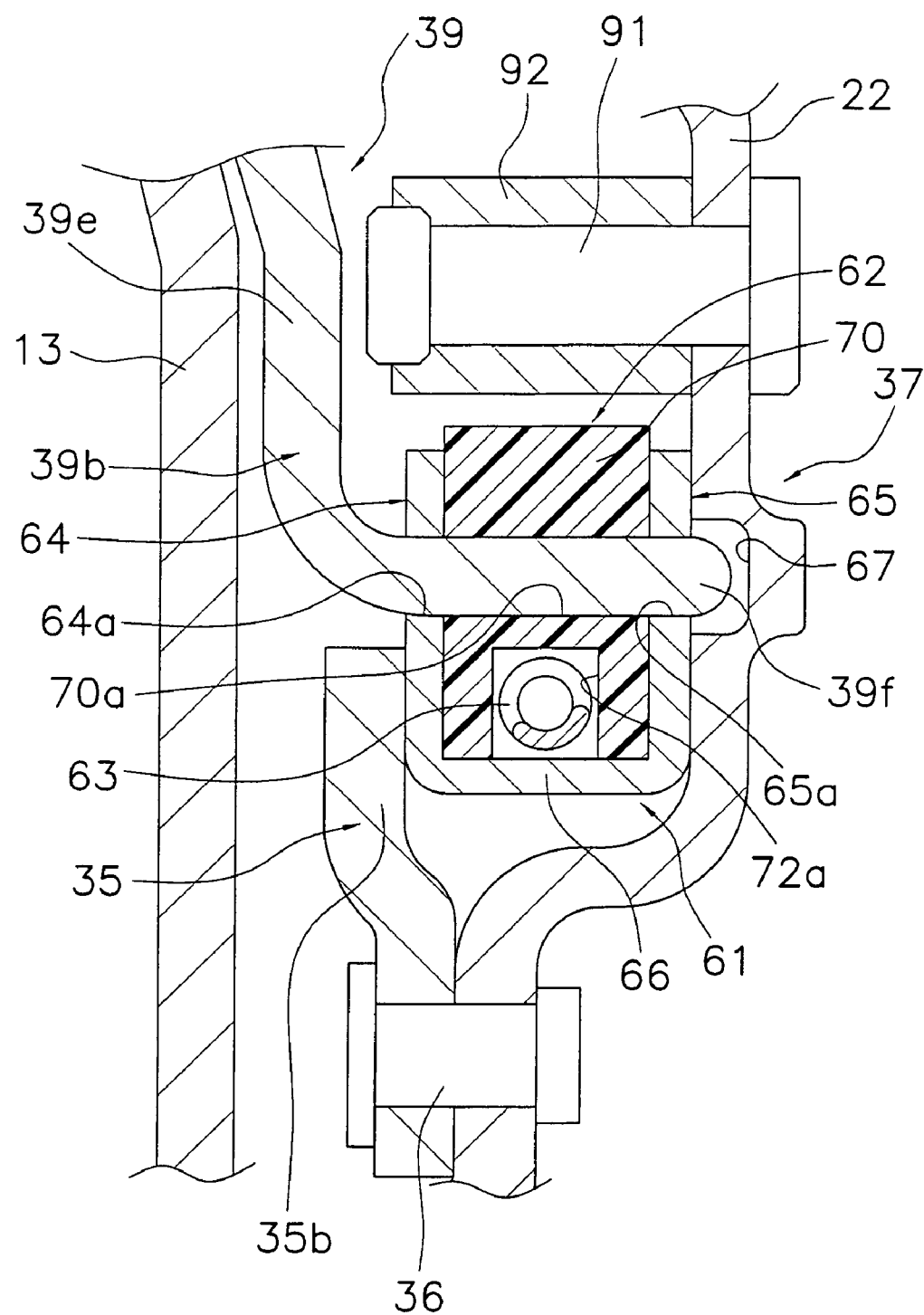
FIG. 16 is a cross-sectional view of a spring rotational supporting mechanism of the damper mechanism.

Referring again to FIGS. 1 and 2, the support plate 39 is fixed to the surface of the radially inner portion of the disk-like member 13 on the transmission side in the axial direction. The support plate 39 is formed of a disk-like portion 39a and a plurality of (four in this embodiment) radial protrusions 39b extending radially outward from the outer periphery of the disk-like portion 39a. Each protrusion 39b is provided at diametrally opposite two positions with circular apertures 39d each defined by a surface that tapers. A bolt 40 is fitted into each circular aperture 39d. The bolt 40 is engaged with a screw aperture 33 in the disk-like member 13 to fix the support plate 39 to the disk-like member 13. The radially inward edge of the disk-like portion 39a is in contact with the radially outer surface of the radially inner cylindrical portion 13b of the disk-like member 13 so that the support plate 39 is centered relative to the disk-like member 13. As shown in FIG. 1, the disk-like portion 39a is provided with a plurality of circular apertures 39c corresponding to the bolt 15 through apertures 13a of the disk-like member 13, into which shanks of the bolts 15 are fitted, respectively. As shown in FIG. 2, each protrusion 39b is formed of a radial extension 39e extending substantially along the disk-like member 13, and an axial extension 39f extending axially toward the transmission from the end of the extension 39e. Referring now to FIG. 16, the axial extension 39f of the protrusion 39b is inserted into apertures 64a, 65a, and 70a in each spring rotating-direction support mechanism 37 from the engine side, and can be engaged therewith. As described above, the spring rotating-direction support mechanism 37 and the support plate 39 function as members on the torque input side of the high rigidity damper 38.

Referring again to FIGS. 1 and 2, the support plate 39 functions as a bending direction support mechanism to support elastically the second flywheel assembly 5 relative to the crankshaft 2 in the bending direction. The support plate 39 has a high rigidity in the rotating direction to transmit torque and a low rigidity in the bending direction such that the support plate 39 is flexible in response to bending vibrations from the crankshaft 2. The radial extension 39e is located on the transmission side of the disk-like member 13 defining a small axial gap therebetween so that the protrusion 39b can deform to approach the disk-like member 13 within a small range. Next, the spring rotating-direction support mechanism 37 is engaged with the support plate 39 and located between the coil springs 32 in the rotating direction. The spring rotating-direction support mechanism 37 has at least the following three functions:

1) supporting the coil springs 32 in the rotating direction (explained later)

2) providing a first stage low rigidity damper (explained later)

3) providing a portion to be supported by the support plate 39 (explained before)

Accordingly the spring rotating-direction support mechanism 37 might be called a low rigidity damper or support plate engagement portion.

The spring rotating-direction support mechanism 37 will be described in detail primarily referring to FIGS. 16–30. The spring rotating-direction support mechanism 37 is located corresponding to the axial extensions 39f of the support plate 39. With reference to FIG. 3, there are preferably four spring rotating-direction support mechanisms 37 in this embodiment. As seen in FIG. 16, each of the mechanisms 37 is a low rigidity damper itself composed of a plate 61, a block 62, and a spring 63 elastically connecting the plate 61 and block 62 in the rotating direction.

Figure 17:
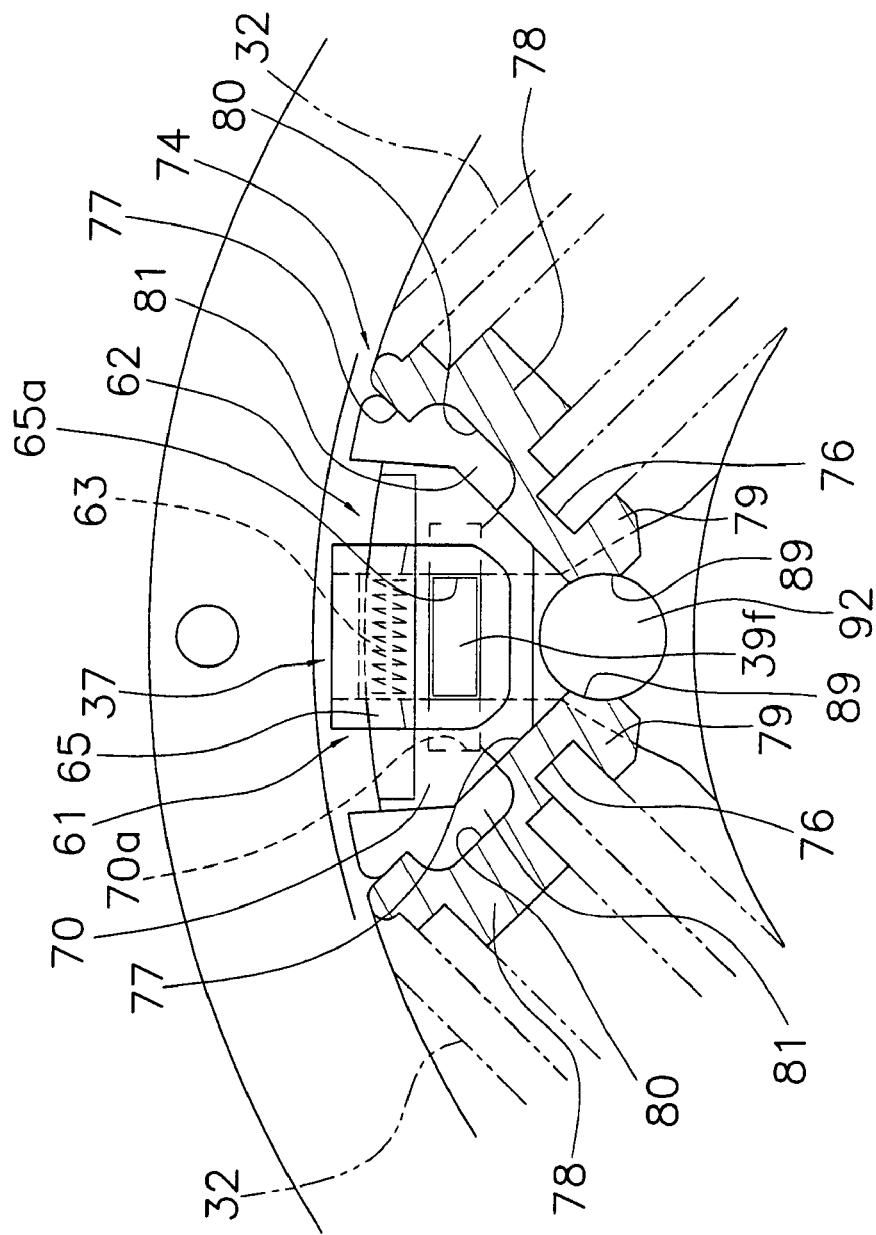
FIG. 17 is an elevational view of the spring rotational supporting mechanism.
Figure 18:
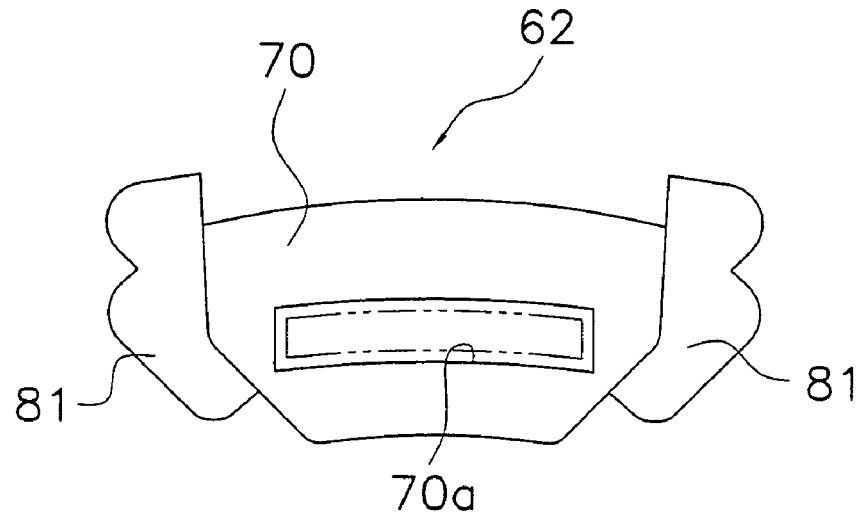
FIG. 18 is an elevational view of a block of the spring rotational supporting mechanism.
Figure 19:
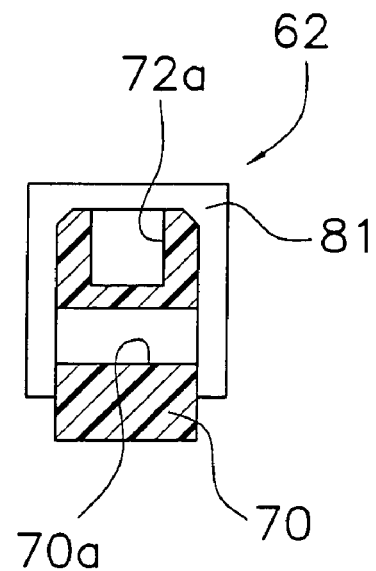
FIG. 19 is a vertical cross-sectional view of the block.

The plate 61 is an input member arranged in the spring rotating-direction support mechanism 37 to which torque is transmitted directly from the support plate 39. The plate 61 is, as shown in FIGS. 16, and 22–26, a U-like shape member preferably made of metal, for example. The plate 61 is composed of flat portions 64 and 65 on both axial sides and a connection portion 66 connecting the radially outward edges of the flat portions 64 and 65. The plate 61 is open in the radially inward and rotating directions. The flat portions 64 and 65 respectively are formed with apertures 64a and 65a penetrating in the axial direction and elongated in the rotating direction. The axial extension 39f of the support plate 39 is inserted into the apertures 64a and 65a. As shown in FIG. 17, the rotating direction length of the axial extension 39f is almost the same as that of the apertures 64a and 65a so that the rotating direction ends of the axial extension 39f and the apertures 64a and 65a are in contact or have a small gap therebetween. Further, the radial direction length of the axial extension 39f is almost the same as that of the apertures 64a and 65a so that the radial ends of the axial extension 39f and the apertures 64a and 65a are in contact or have a small gap therebetween. As seen in FIG. 16, the distal end of the axial extension 39f extends beyond the flat portion 65 in the axial direction and is located in the concave portion 67 of the disk-like plate 22. The concave portion 67 is longer in the rotating direction than the axial extension 39f so that the axial extension 39f can move in the rotating direction within the concave portion 67. As shown in FIGS. 1 and 2, the disk-like plate 22 is axially supported by the support plate 39 because the concave portion 67 and the end of the axial extension 39f face each other in the axial direction.

Referring again to FIG. 16, the plate 61 is supported by the disk-like plate 22 such that the plate 61 cannot move in either of the axial directions. Specifically, the axial surface on the engine side of the flat portion 64 is supported by the support portion 35b of the support plate 35, and the axial surface on the transmission side of the flat portion 65 is supported by the disk-like plate 22. In this arrangement, the plate 61 can slide against the disk-like plate 22 in the rotating direction. As seen in FIGS. 1 and 2, it is easy to manage and to assemble the second flywheel assembly 5 because the spring rotating-direction support mechanism 37 is held by the flywheel 21 and the disk-like plate 22. It is easily understood that the spring support plate 35 is an annular member having the spring support portions 35a and the support portions 35b arranged in an alternating way in the rotating direction.

Figure 22:
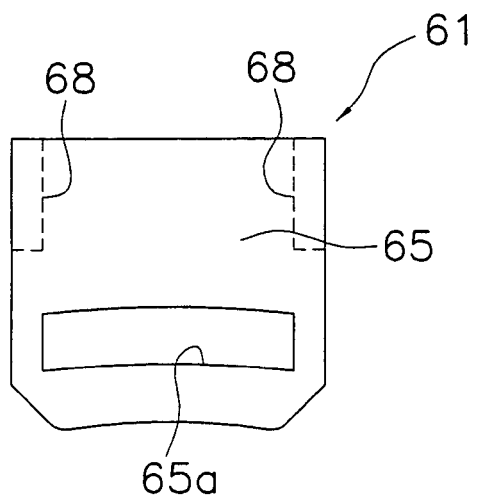
FIG. 22 is an elevational view of a plate of the spring rotational supporting mechanism.
Figure 23:
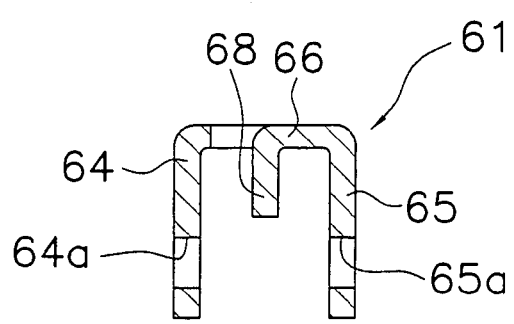
FIG. 23 is a vertical cross-sectional view of the plate.
Figure 24:
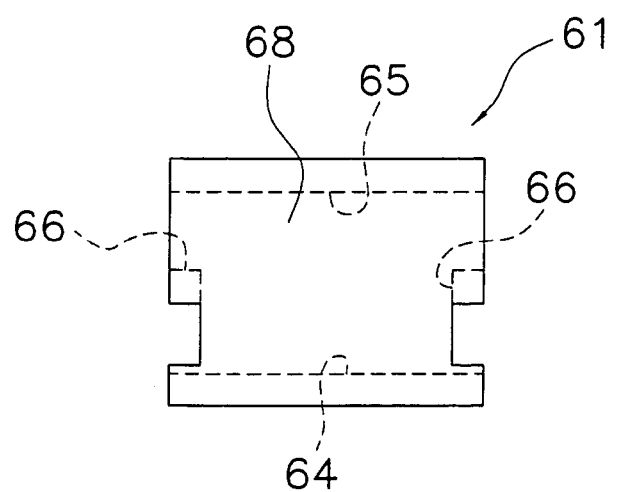
FIG. 24 is a plan view of the plate.

As seen in FIGS. 22 and 23, the plate 61 further has a pair of protrusions 68 at both the rotating direction end of the connection portion 66 bent from the axially middle portion toward a radially outward direction. The protrusions 68 are claws that directly contact the spring 63 (later described).

The block 62 is, as shown in FIG. 16–21, disposed within the plate 61, i.e., between the flat portions 64 and 65 and radially inward of the connection portion 66. The block 62 is a block shape member preferably made of resin, for example. The outer size of the block 62 is almost the same with the inner size of the plate 61 so that there is little or no gap therebetween. Accordingly, the block 62 can slide against the plate 61 in the rotating direction within a limited angle. The block 62 has a main body 70 formed with an axially penetrating aperture 70a located corresponding to the apertures 64a and 65a of the plate 61. The aperture 70a has the same radial position and length as the apertures 64a and 65a, but is longer than the apertures 64a and 65a in the rotating direction. Thus, the rotation direction ends of the aperture 70a is positioned rotationally outward of rotating direction ends of the apertures 64a and 65a. The axial extension 39f extends into the aperture 70a and can move in the rotating direction within the aperture 70a. When the axial extension 39f contacts the rotating direction end of the aperture 70a, relative rotation stops between the input members such as the axial extension 39f and the plate 61, and output member such as the block 62.

Figure 20:
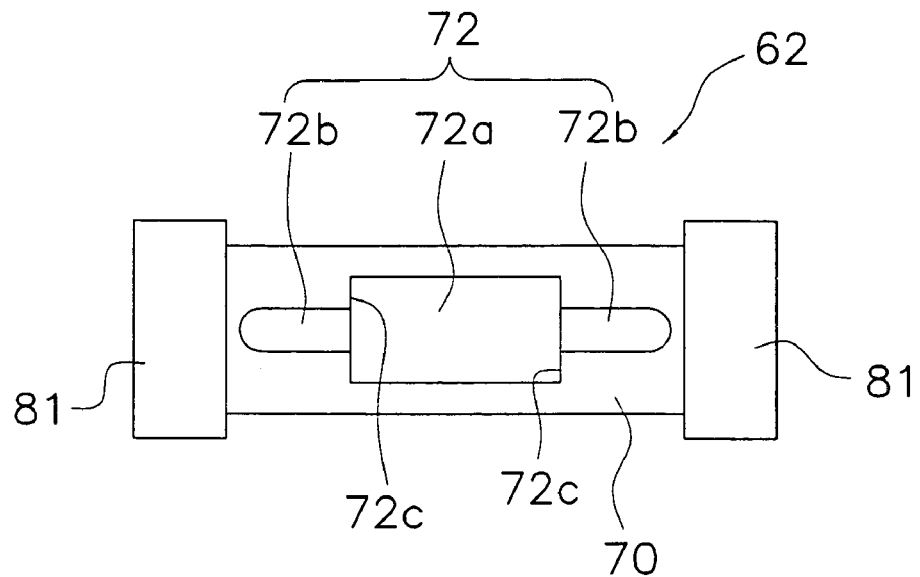
FIG. 20 is a top plan view of the block.
Figure 21:
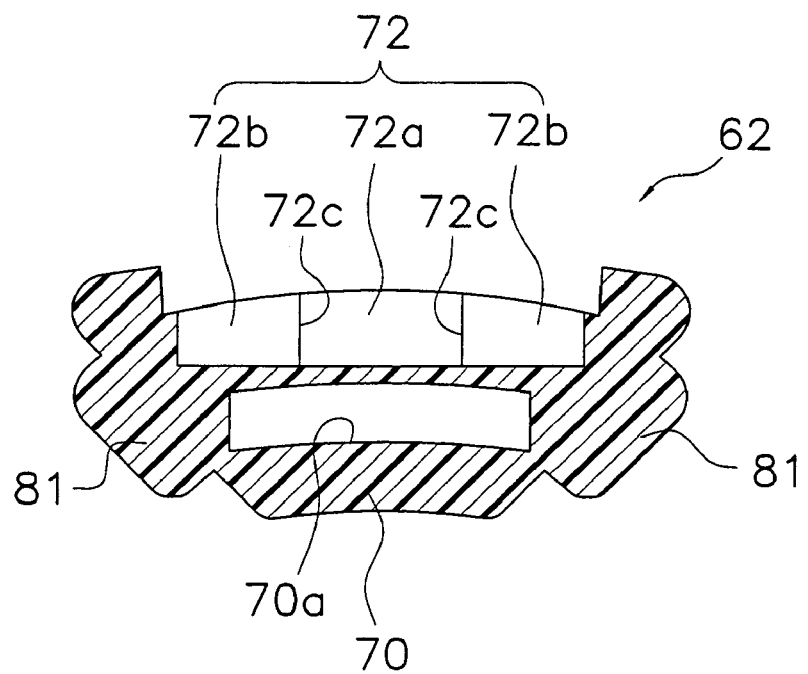
FIG. 21 is an alternate cross-sectional view of the block.
Figure 25:
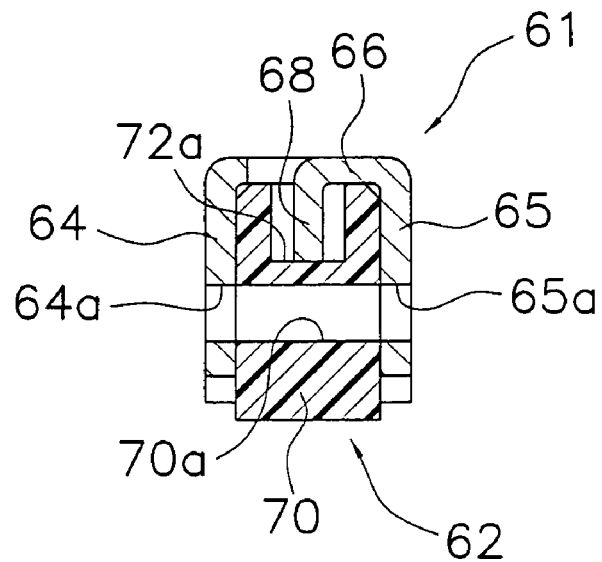
FIG. 25 is a vertical cross-sectional view of a low rigidity damper of the spring rotational supporting mechanism.
Figure 26:
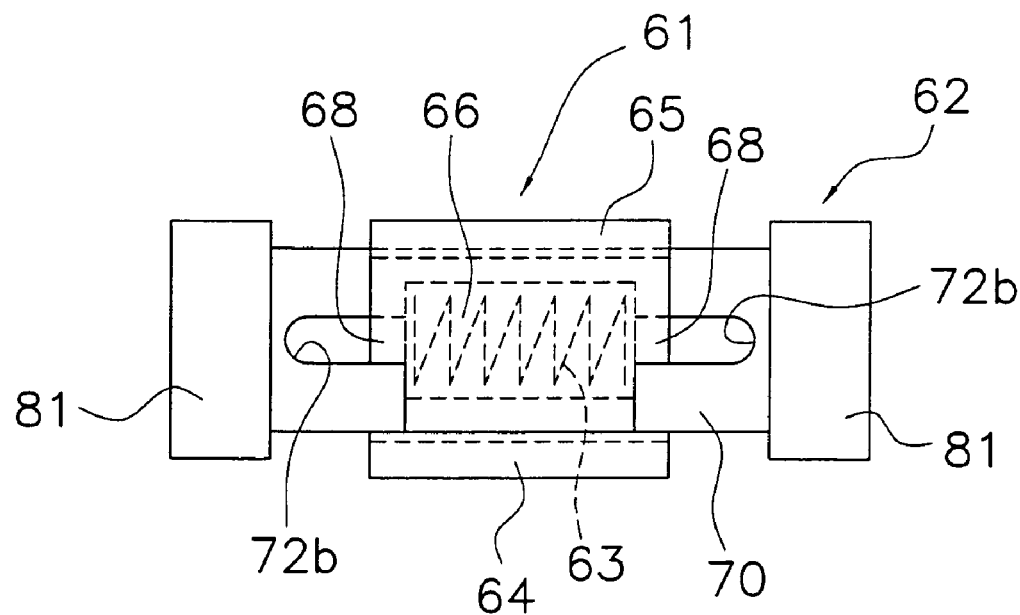
FIG. 26 is a top plan view of the low rigidity damper.
Figure 27:
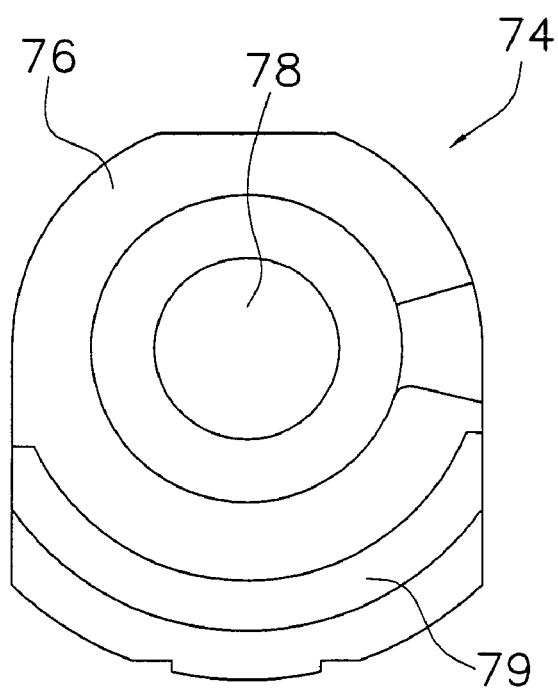
FIG. 27 is a front view of a spring seat of the spring rotational supporting mechanism.

The main body 70 of the block 62 is formed with a groove 72 on the radially outward surface. The groove 72 is a space confined or covered by the connection portion 66 of the plate 61. The groove 72 has, as shown in FIGS. 20 and 21, a first concave portion 72a and a pair of second concave portions 72b extending in the rotating direction from the first concave portion 72a. The second concave portions 72b has the depth in the radial direction that is the same as that of the first concave portion 72a, but is shorter than the first concave portion 72a in the axial direction. Accordingly, end surfaces 72c as stepped surfaces are formed at the rotating direction ends of the first concave portions 72a. The second concave portions 72b extend from the axially middle portion of the first concave portion 72a. As seen in FIG. 16, a spring 63 is disposed in the first concave portion 72a. The spring 63 is a coil spring having extremely short wire diameter, coil diameter, and axial length relative to the coil spring 32. The spring 63 has an extremely small spring constant compared to that of the coil spring 32. More preferably, the spring 63 has a spring constant that is 1/10 or less of that of coil spring 32. Furthermore, as seen in FIGS. 17, 25, and 26, the protrusion 68 of the plate 61 is disposed in the second concave portion 72b, and more specifically the protrusion 68 is disposed near the rotating direction ends of the first concave portion 72a and are in contact with or maintain a small gap with the rotating direction ends of the spring 63. The protrusion 68 can move within not only the second concave portion 72b but also the first concave portion 72a. Accordingly, the spring 63 can be compressed in the rotating direction between the plate 61 and the block 62, more specifically between the protrusion 68 of the plate 61 and the end surface 72c of the first concave portion 72a of the block 62. In addition, the spring 63 is held between the plate 61 and the block 62, that is, the spring 63 is supported in the rotational, axial, and radial direction by the plate 61 and block 62. More specifically, the spring 63 is accommodated within the confined space defined by the first concave portion 72a and the connection portion 66 of the plate 61.

Spring seats 74 are provided at the rotating direction ends of the block 62 to support the coil spring 32 in the rotating direction. The spring seat 74 is, as shown in FIG. 28–31, a member having a substantially circular shape. As seen in FIG. 17, the spring seat 74 has a front surface 76 that contacts a rotating direction end of the coil spring 32 and a rear surface 77 that contacts the block 62 on the opposite side.

Figure 28:
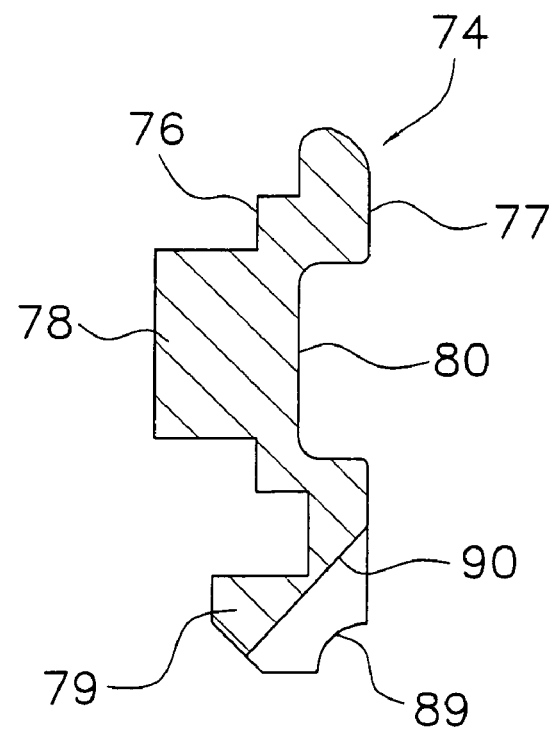
FIG. 28 is a vertical cross-sectional view of the spring seat.
Figure 29:
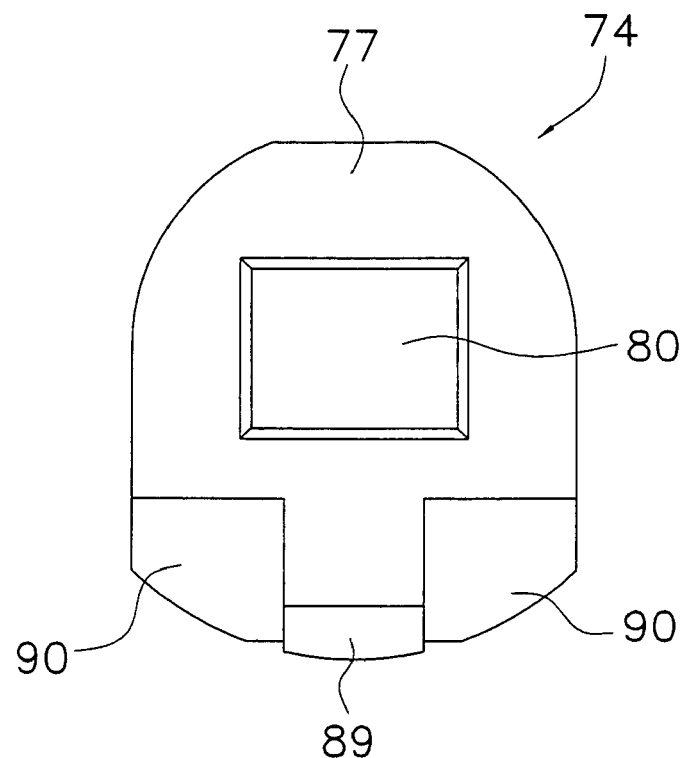
FIG. 29 is a rear view of the spring seat.
Figure 30:
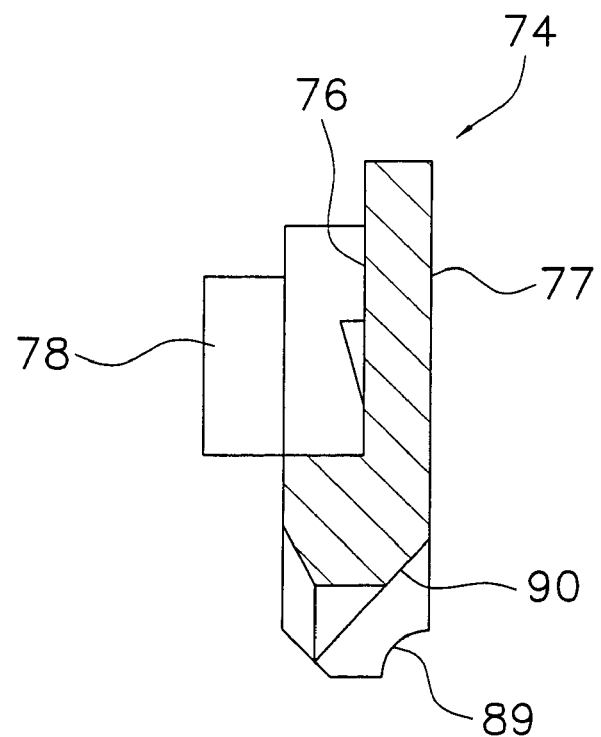
FIG. 30 is a vertical cross-sectional view of the spring seat.

The spring seat 74 further has a first protruding portion 78 having a columnar shape extending into and engaging with the coil spring 32 and a second protruding portion 79 having an arc shape to support the radially outward surface of the radially inward portion of the coil spring 32 on the front surface 76. The spring seat 74 further has a concave portion 80 having a substantially rectangular shape with which a part of the block 62 is engaged on the rear surface 77. A convex portion 81 that is formed at each of the rotating direction ends of the block 62 is inserted into the concave portion 80 in the rotating direction. The convex portion 81 can be engaged with and disengaged from the concave portion 80 in the rotating direction and supports the spring seat 74 such that the spring seat 74 cannot move in the radial direction. An arc surface 89, a part of a circle seen in the axial direction, is formed at the axially middle portion of the radially inward side on the rear surface 77 side of the spring seat 74. As seen in FIG. 28, inclined surfaces 90 are formed on the axial sides of the arc surface 89 and its rotating direction thickness becomes shorter as it extends radially outward.

As seen in FIGS. 16 and 17, the rear surface 77 of the spring seat 74, more specifically the radially outward portion of the rear surface 77, is supported by the rotating direction ends of the spring support portion 29 of the disk-like plate 22 in the rotating direction. Collars 92 are provided on the disk-like plate 22 radially inward of the spring rotating-direction support mechanism 37. Further, each collar 92 is fixed to the disk-like plate 22 by a rivet 91. The collars 92 axially extend from the disk-like plate 22 and are in contact with the arc surface 89 of the spring seat 74. The collar 92 can be engaged with and disengaged from the arc surface 89 of the spring seat 74 in the rotating direction. The above-mentioned engagement of the collar 92 and the spring seat 74 makes it possible to transmit torque between them. Consequently, by transmitting torque from the collar 92 to the disk-like plate 22, it is possible to support the radially inward portion of the spring seat 74 even if the drawing of the spring support portion 29 of the disk-like plate 22 is not extremely deep.

Since the spring rotating-direction support mechanisms 37 are disposed between the coil springs 32 in the rotating direction, it is possible to decrease the diameter of the damper mechanism 6, especially because the springs 63 are located completely within an annular area defined by a radially inner edge and a radially outer edge of the coil springs 32.

Referring to FIGS. 1 and 2, the function of the support plate 39 is at least as follows:

1) supporting the second flywheel assembly 5 on the crankshaft 2 in the axial direction;

2) supporting the second flywheel assembly 5 on the crankshaft 2 in the radial direction;

3) supporting the second flywheel assembly 5 such that the second flywheel assembly 5 can move relative to the crankshaft 2 in the bending direction; and 4) transmitting torque from the crankshaft 2 to the second flywheel assembly 5

Since the support plate 39 is designed to handle a multitude of functions, some of which are mentioned above, individual components for each function are not needed, thus the number of the components is less than in conventional assemblies. Since the support plate 39 is a simple member on the whole, the overall structure of the flywheel is further simplified. Furthermore, since the axial extensions 39*f* of the support plate 39 is engaged with the spring rotating-direction support mechanism 37 of the damper mechanism 6 such that the spring rotating-direction support mechanism 37 is attachable to and detachable from the axial extensions 39*f*, it is easy to assemble the second flywheel assembly 5 to the crankshaft 2 and disassemble the second flywheel assembly 5 from the crankshaft 2.

Still referring to FIGS. 1 and 2, the frictional resistance generating mechanism 7 operates in a rotating direction space between the crankshaft 2 and the flywheel 21 having the friction surface. Further, the frictional resistance generating mechanism 7 functions in parallel with the coil spring 32 to generate a predetermined hysteresis torque when relative rotation occurs between the crankshaft 2 and the flywheel 21 with the friction surface. The frictional resistance generating mechanism 7 is formed of a plurality of washers, which are arranged between the second friction surface 21*b* of the flywheel 21 having the friction surface and the contact portion 27 of the disk-like plate 22, and are in contact with each other. As seen in FIG. 4, the frictional resistance generating mechanism 7 has a first friction washer 41, a first friction plate 42, a conical spring 43, a second friction plate 44, and a second friction washer 45, which are axially aligned in this order from the position near the contact portion 27 toward the flywheel 21 with the friction surface. The first and second friction washers 41 and 45 are preferably made of a material having a high friction coefficient, and other members are preferably made of steel. As described above, the disk-like plate 22 has a function of holding the frictional resistance generating mechanism 7 on the side of the flywheel 21 with the friction surface. This arrangement reduces the number of parts, and simplifies the structure.

The first friction washer 41 is located between the contact portion 27 and the first friction plate 42. In this embodiment, the first friction washer 41 is fixed to the first friction plate 42. Alternatively, it may be fixed to the contact portion 27, or may be fixed to neither of them. The first friction plate 42 is located between the first friction washer 41 and the conical spring 43. The first friction plate 42 is provided at its outer periphery with a plurality of protrusions 42*a* extending axially toward the transmission. A radially inner surface of the end of each protrusion 42*a* is preferably in contact with the outer peripheral surface of the flywheel 21 having the friction surface, and is radially supported thereby. The conical spring 43 has a conical form when it is not compressed. In FIG. 4, the conical spring 43 is compressed between the first and second friction plates 42 and 44 into a flat form so that it applies an elastic force to the members on the opposite sides. The second friction plate 44 is located between the conical spring 43 and the second friction washer 45. The second friction plate 44 is provided at its inner periphery with an inner cylindrical portion 44*a* extending axially toward the engine. The inner peripheral surface of the radially inner cylindrical portion 44*a* is radially supported by the disk-like plate 22. The outer peripheral surface of the inner cylindrical portion 44*a* is in contact with the inner peripheral surfaces of the first friction plate 42 and the conical spring 43 to support them radially. The second friction plate 44 is provided at its outer periphery with recesses 44*e*, through which the foregoing protrusions 42*a* extend for engagement, respectively. Owing to this engagement, the first friction plate 42 is axially movable but rotationally unmovable with respect to the second friction plate 44. The second friction washer 45 is located between the second friction plate 44 and the second friction surface 21*b* of the flywheel 21 having the friction surface. In this embodiment, the second friction washer 45 is fixed to the second friction plate 44. However, it may be fixed to the flywheel 21 having the friction surface, or may be fixed to neither of them.

The second friction plate 44 is provided at its outer periphery with a plurality of protrusions 44*b*. The protrusions 44*b* are formed corresponding to the recesses 26*a*, respectively, and each are formed of a protruding portion 44*c* extending radially outward and a claw 44*d* extending axially toward the engine from the end of the protruding portion 44*c*. The protruding portion 44*c* extends radially through the recess 26*a*. The claw 44*d* is located radially outside the cylindrical portion 26, and extends axially into the recess 20*a* in the cylindrical portion 20 of the disk-like member 13 from the transmission side. The claw 44*d* and the recess 20*a* form a rotating-direction engaging portion 69 located between the disk-like member 13 and the second friction plate 44. Thus, the disk-like member 13 is a lock member that locks with the frictional resistance generating mechanism 7.

Figure 15:
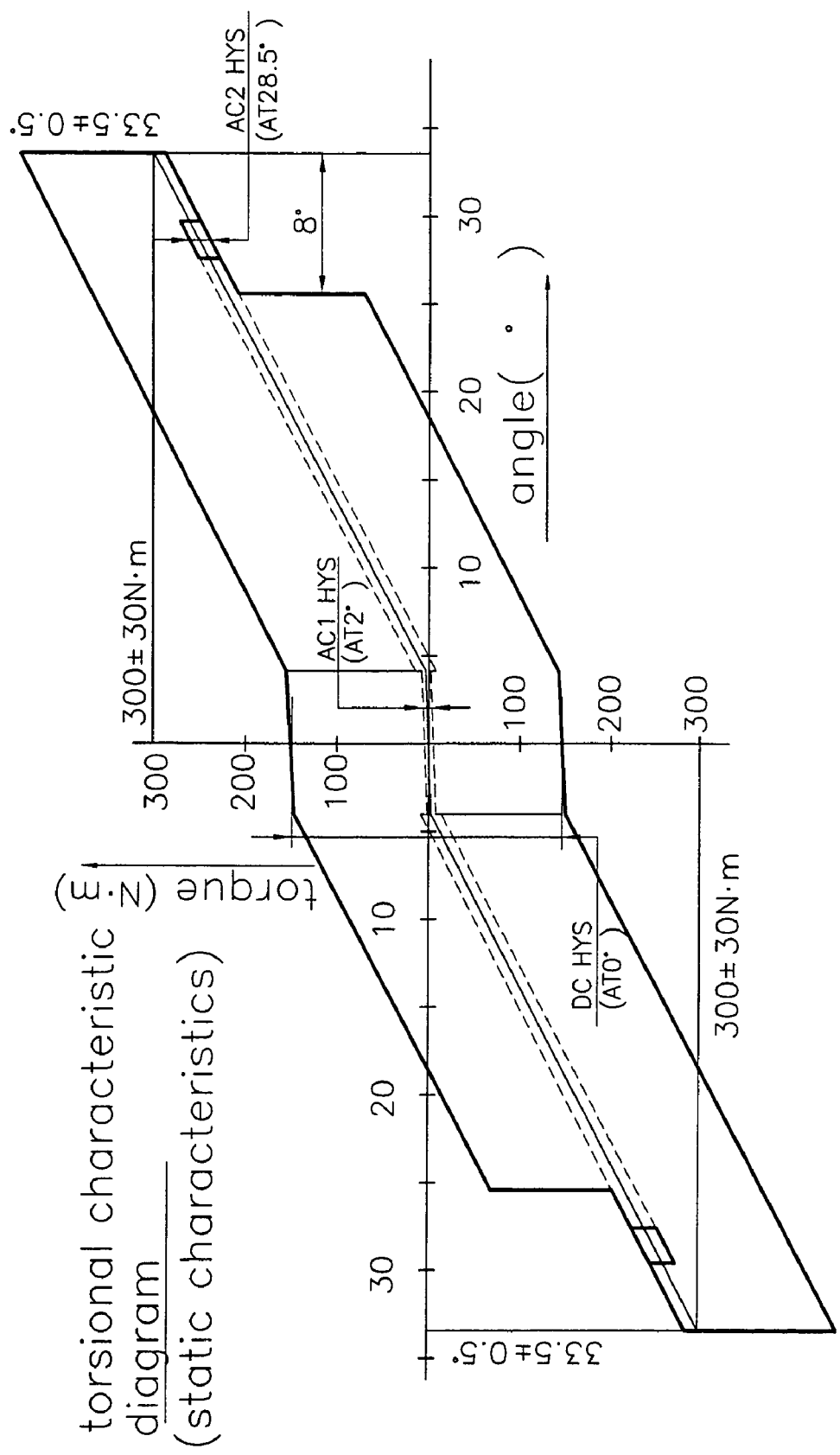
FIG. 15 is a view of a graph that illustrates torsion characteristics of the damper mechanism.

As seen in FIG. 5, in the rotating-direction engaging portion, the claw 44*d* has a circumferential width (i.e., width in the rotating direction) smaller than that of the recess 20*a*, and therefore can move a predetermined angle within the recess 20*a*. This means that the second friction plate 44 is movable through a predetermined angular range with respect to the disk-like member 13. This predetermined angle corresponds to minute torsional vibrations caused by variations in engine combustion, and has magnitudes to absorb effectively such vibrations without causing a high hysteresis torque. More specifically, a circumferential gap 46 of a torsion angle θ1 is maintained in the rotating direction R1 with respect to the claw 44*d*, and a rotating direction space 47 of a torsion angle θ2 is maintained in the rotating direction R2. Consequently, a total of the torsion angles θ1 and θ2 is equal to the predetermined angle, which is the angle the second friction plate 44 can rotate relatively to the disk-like member 13. As seen in FIG. 15, in this embodiment, the total torsion angle is preferably equal to 8 degrees, and is preferably in a range slightly exceeding the damper operation angle, which is produced by minute torsional vibrations due to the variations in engine combustion.

From another viewpoint, with reference to FIG. 11, the minute circumferential spaces 46 and 47 may be considered to be formed by the claw 20*b* of the disk-like member 13 and the claw 44*d* of the second friction plate 44. Each of the claws 20*b* and 44*d* is formed by axially bending a radially outer portion of the disk-like member 13 and the second friction plate 44. Thus, each of the claws 20*b* and 44*d* has a simple structure.

The minute circumferential spaces 46 and 47, which are formed by the recesses 20*a* in the disk-like member 13 and the claws 44*d* of the second friction plate 44 as described above, can be provided merely by locating the first and second flywheel assemblies 4 and 5 close to each other in the rotating direction, and fitting the claws 44d into the recesses 20a, respectively. This facilitates the assembling operation.

Since the minute circumferential spaces 46 and 47 formed by the recesses 20a in the disk-like member 13 and the claws 44d of the second friction plate 44 are formed between the radially outer portions of the first and second flywheel assemblies 4 and 5, the radially inner portion of each of the flywheel assemblies 4 and 5 can be designed with high flexibility.

As seen in FIGS. 1 and 2, the radial position of the frictional resistance generating mechanism 7 is radially outward that of the damper mechanism 6, and the frictional resistance generating mechanism 7 is located within an axial space defined by the axial edges of the coil springs 32. As explained above, the damper mechanism 6 and the frictional resistance generating mechanism 7 are aligned in the radial direction, i.e., the radial positions are different and the axial positions are substantially the same, so that the axial length of the flywheel damper 11 is smaller than those of conventional dampers.

The clutch cover assembly 8 elastically biases a friction facing (frictional connection portion) 54 of the clutch disk assembly 9 toward the first friction surface 21a of the flywheel 21 having the friction surface. The clutch cover assembly 8 is primarily formed of a clutch cover 48, a pressure plate 49, and a diaphragm spring 50.

The clutch cover 48 is a disk-like member preferably made of sheet metal, and has a radially outer portion fixed to the flywheel 21 having the friction surface by bolts 51.

The pressure plate 49 is preferably made of, e.g., cast iron. The pressure plate 49 is arranged radially inside the clutch cover 48, and is axially located on the transmission side with respect to the flywheel 21 having the friction surface. The pressure plate 49 has a pressing surface 49a opposed to the first friction surface 21a of the flywheel 21 having the friction surface. The pressure plate 49 is provided on its surface remote from the pressing surface 49a with a plurality of arc-shaped protruding portions 49b protruding toward the transmission. The pressure plate 49 is unrotatably coupled to the clutch cover 48 with a plurality of arc-shaped strap plates 53 allowing axial movement. In the clutch engaged state, the strap plates 53 applies a load to the pressure plate 49 to move it away from the flywheel 21 having the friction surface.

The diaphragm spring 50 is preferably a disk-like member arranged between the pressure plate 49 and the clutch cover 48, and is formed of an annular elastic portion 50a and a plurality of lever portions 50b extending radially inward from the elastic portion 50a. The elastic portion 50a is in axial contact with the transmission side of the protruding portion 49b of the pressure plate 49.

The clutch cover 48 is provided at its inner periphery with a plurality of tabs 48a, which extend axially toward the engine, and then are bent radially outward. Each tab 48a extends toward the pressure plate 49 through an aperture in the diaphragm spring 50. Two wire rings 52 supported by the tabs 48a support the axially opposite sides of the radially inner portion of the elastic portion 50a of the diaphragm spring 50. In this state, the elastic portion 50a is axially compressed to apply an axial elastic force to the pressure plate 49 and the clutch cover 48.

The clutch disk assembly 9 has a friction facing 54 arranged between the first friction surface 21a of the flywheel 21 having the friction surface and the pressing surface 49a of the pressure plate 49. The friction facing 54 is fixed to a hub 56 via an annular disk-like plate 55. The hub 56 has a central aperture for spline-engagement with the transmission input shaft 3.

The release device 10 is a mechanism for driving the diaphragm spring 50 of the clutch cover assembly 8 to perform the clutch releasing operation on the clutch disk assembly 9. The release device 10 is primarily formed of a release bearing 58 and a hydraulic cylinder device (not shown). The release bearing 58 is primarily formed of inner and outer races as well as a plurality of rolling elements arranged therebetween. The release bearing 58 can bear radial and thrust loads. A cylindrical retainer 59 is attached to an outer race of release bearing 58. The retainer 59 has a cylindrical portion in contact with the outer peripheral surface of the outer race, a first flange, which extends radially inward from an axial end on the engine side of the cylindrical portion and is in contact with the surface of the engine side of the outer race, and a second flange extending radially outward from an end on the transmission side of the cylindrical portion. The second flange is provided with an annular support portion, which is in axial contact with a portion on the transmission side of the radially inner end of each lever portion 50b of the diaphragm spring 50.

A hydraulic cylinder device is primarily formed of a hydraulic chamber forming member and a piston 60. The hydraulic forming member and the cylindrical piston 60 arranged radially inside the member define a hydraulic chamber between them. The hydraulic chamber can be supplied with a hydraulic pressure from a hydraulic circuit. The piston 60 has a substantially cylindrical form, and has a flange, which is in axial contact with the inner race of the release bearing 58 from the transmission side. When the hydraulic circuit supplies hydraulic fluid into the hydraulic chamber, the piston 60 axially moves the release bearing 58 toward the engine.

As already described, each of the first and second flywheel assemblies 4 and 5 provides an assembly independent of the other, and is axially removably attached. More specifically, the first and second flywheel assemblies 4 and 5 are engaged with each other owing to engagement between the cylindrical portion 20 and the second friction plate 44, engagement between the disk-like member 13 and the contact portion 27, engagement between the spring support plate 35 and the spring rotating-direction support mechanism 37, and engagement between the radially inner cylindrical portion 13b and the radially inner cylindrical portion 31, which are provided at positions located radially inward in this order, respectively. These assemblies 4 and 5 are axially movable through a predetermined range with respect to each other. More specifically, the second flywheel assembly 5 is axially movable with respect to the first flywheel assembly 4 between a position, where the contact portion 27 is slightly spaced from the friction member 19, and a position, where the contact portion 27 is in contact with the friction member 19.

(2) Operation (2-1) Torque Transmission

In this clutch device 1, a torque is supplied from the crankshaft 2 of the engine to the flywheel damper 11, and is transmitted from the first flywheel assembly 4 to the second flywheel assembly 5 via the damper mechanism 6. In the damper mechanism 6, the torque is transmitted through the support plate 39, the spring rotating-direction support mechanism 37, the high rigidity damper 38 and the disk-like plate 22 in this order. As shown in FIG. 16, in the spring rotating-direction support mechanism 37, torque is transmitted through the plate 61, the spring 63 and the block 62 in this order. As shown in FIGS. 3, 16, and 17, in the high rigidity damper 38, torque is transmitted through the spring seat 74, the coil spring 32, and the spring seat 74. Torque is transmitted from the high rigidity damper 38 to the disk-like plate 22 via the collars 92 and the rivets 91. Referring again to FIGS. 1 and 2, further, the torque is transmitted from the flywheel damper 11 to the clutch disk assembly 9 in the clutch engaged state, and is finally provided to the input shaft 3.

Figure 14:
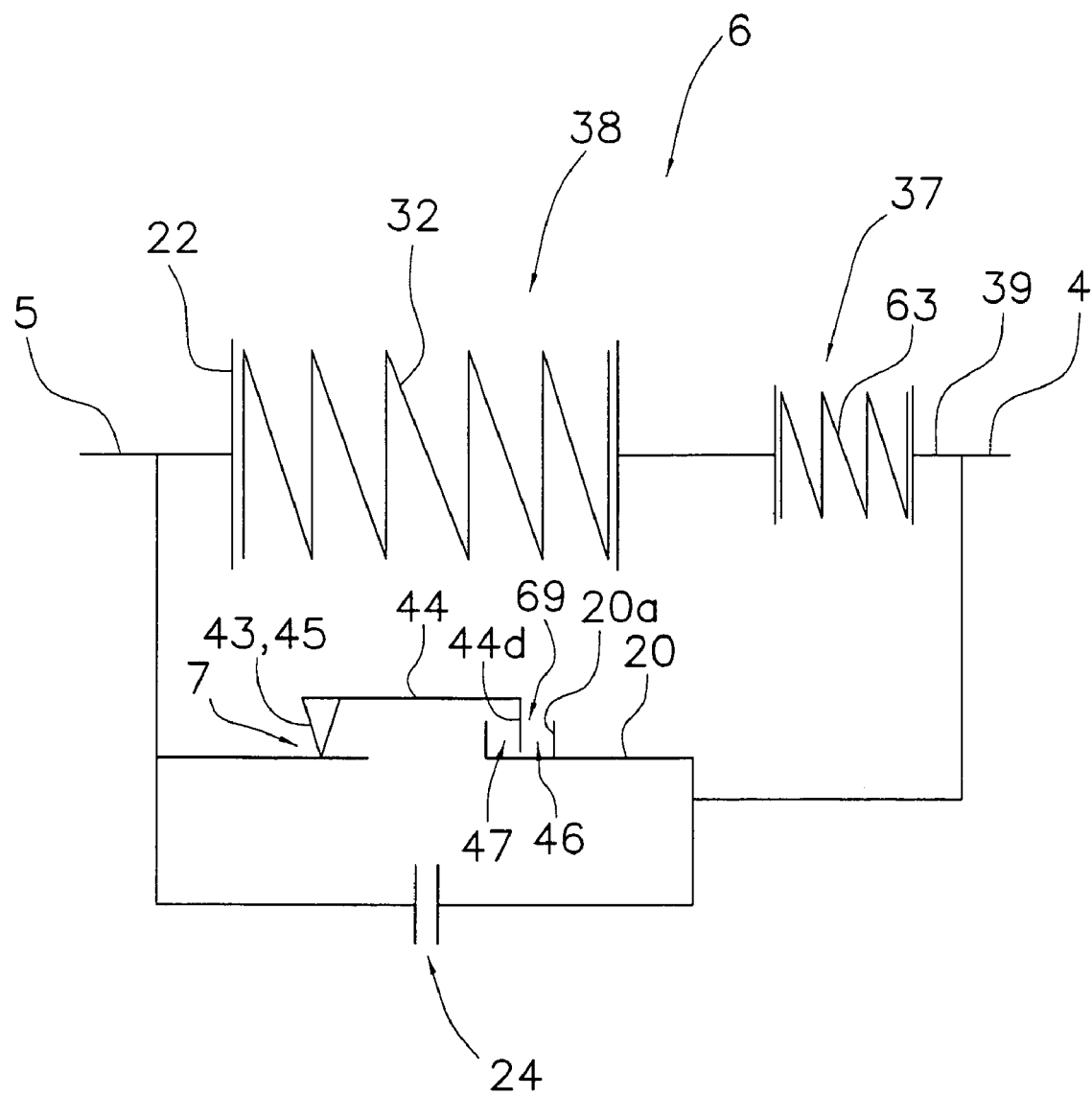
FIG. 14 is a view of a mechanical circuit diagram of a damper mechanism of the clutch device of FIG. 1.

As seen in FIG. 14, when the clutch device 1 receives combustion variations from the engine, the spring rotating-direction support mechanism 37 and the high rigidity damper 38 operate in the damper mechanism 6. As seen in FIG. 17, in the spring rotating-direction support mechanism 37, the plate 61 and the block 62 rotate relatively to compress the spring 63. Referring again to FIG. 14, in the high rigidity damper 38, the support plate 39 and the spring rotating-direction support mechanism 37 rotate relative to the disk-like plate 22 to compress the plurality of coil springs 32 in the rotating direction. Further, the frictional resistance generating mechanism 7 generates a predetermined hysteresis torque. Through the foregoing operations, the torsional vibrations are absorbed and damped.

More specifically, as seen in FIG. 3, each coil spring 32 is compressed between the spring rotating-direction support mechanism 37 and a circumferential end of the spring support portion 29 of the disk-like plate 22. As seen in FIGS. 4 and 5, in the frictional resistance generating mechanism 7, the first and second friction plates 42 and 44 rotate together with the disk-like member 13, and rotate relatively to the disk-like plate 22 and the flywheel 21 having the friction surface. Consequently, the first friction washer 41 slides between the contact portion 27 and the first friction plate 42, and the second friction washer 45 slides between the second friction plate 44 and the flywheel 21 having the friction surface. Since two friction surfaces reliably operate, a relatively large hysteresis torque occurs. In the above structure, the second friction surface 21b of the flywheel 21 having the friction surface provides the friction surface of the frictional resistance generating mechanism 7. This reduces the number of parts, and simplifies the structure relative to the prior art.

It should be noted that the friction surface 21a extends substantially perpendicularly to an original center line that is parallel to the axis of rotation 0—0 of the clutch device 1. However, when bending vibrations of the crankshaft 2 are inputted to the flywheel 21, the flywheel 21 whirls, and the friction surface 21a is tilted relative to the original center line.

When the minute torsional vibrations caused by the variations in combustion of the engine are supplied to the clutch device 1, the damper mechanism 6 operates in a manner, which will now be described with reference to a mechanical circuit diagram of FIG. 14 and a torsion characteristic diagram of FIG. 15. When minute torsional vibrations are supplied to the clutch device 1, in which the coil springs 32 of the damper mechanism 6 are in the compressed state, the second friction plate 44 of the frictional resistance generating mechanism 7 rotates relatively to the disk-like member 13 through a range corresponding to the minute circumferential space 46 and 47 between the edge of the recess 20a in the cylindrical portion 20 of the disk-like member 13 and the claw 44d. Thus, the first and second friction plates 42 and 44 rotate together with the contact portion 27 and the flywheel 21 having the friction surface as well as the first and second friction washers 41 and 45 interposed therebetween. Consequently, the minute torsional vibrations do not cause a high hysteresis torque. More specifically, at "AC2 HYS" in the torsion characteristic diagram of FIG. 15, the coil spring 32 operates, but the frictional resistance generating mechanism 7 does not cause the sliding. Thus, in the predetermined torsion angle range, a hysteresis torque much smaller than the ordinary hysteresis torque is produced. This small hysteresis torque is preferably about 1/10 of the hysteresis torque in the whole range. Since the structure includes the minute circumferential-direction space 46 and 47, which prevents operation of the frictional resistance generating mechanism 7 within the predetermined angular range in the torsion angle characteristics, the vibration and noise levels can be significantly reduced.

(2-2) Clutch Engaging and Releasing Operations

Referring now to FIGS. 1 and 2, when the hydraulic circuit (not shown) supplies the hydraulic fluid into the hydraulic chamber of the hydraulic cylinder, the piston 60 moves axially toward the engine. Thereby, the release bearing 58 axially moves the radially inner end of the diaphragm spring 50 toward the engine. Consequently, the elastic portion 50a of the diaphragm spring 50 is spaced from the pressure plate 49. Thereby, the pressure plate 49 biased by the strap plates 53 moves away from the friction facing 54 of the clutch disk assembly 9 so that the clutch is released.

In the clutch release operation, the release bearing 58 applies an axial load directed toward the engine to the clutch cover assembly 8, and this load axially biases and moves the second flywheel assembly 5 toward the engine. Thereby, the contact portion 27 of the disk-like plate 22 in a relative rotation suppressing mechanism 24 is pressed against the friction member 19 to engage frictionally the disk-like member 13. Thus, the second flywheel assembly 5 becomes unrotatable with respect to the first flywheel assembly 4. In other words, the second flywheel assembly 5 is locked with respect to the crankshaft 2 so that the damper mechanism 6 does not operate. Accordingly, when the rotation speed passes through the resonance point in a low speed range (e.g., from 0 to 500 rpm) during starting or stopping the engine, it is possible to suppress the breakage as well as noises and vibrations, which may be caused by the resonance by releasing the clutch.

In this operation, since the damper mechanism 6 is locked by using the load applied from the release device 10 in the clutch releasing operation, the structure can be simple. In particular, since the relative rotation suppressing mechanism 24 is formed of the members with simple structures such as the disk-like member 13 and the disk-like plate 22, a special structure is not required.

Furthermore, in the above-mentioned operation, the second flywheel assembly 5 cannot move relative to the first flywheel assembly 4 in the axial direction and in the bending direction. In other words, the second flywheel assembly 5 is locked with the crankshaft 2 so that the support plate 39 as the bending direction support member does not operate. Accordingly, it suppresses damage or sound and/or vibration of the support plate 39 by resonance. The relative rotation suppressing mechanism 24 functions as a bending direction movement suppression mechanism.

Since the locking of the support plate 39 at the clutch release utilizes a load from the release device 10, a simple structure is realized. The relative rotation suppressing mechanism 24 is composed of members with a simple form such as the disk-like plate member 13 and the disk-like plate 22, thus the clutch device 1 does not need a special structure.

(3) Assembling

Figure 31:
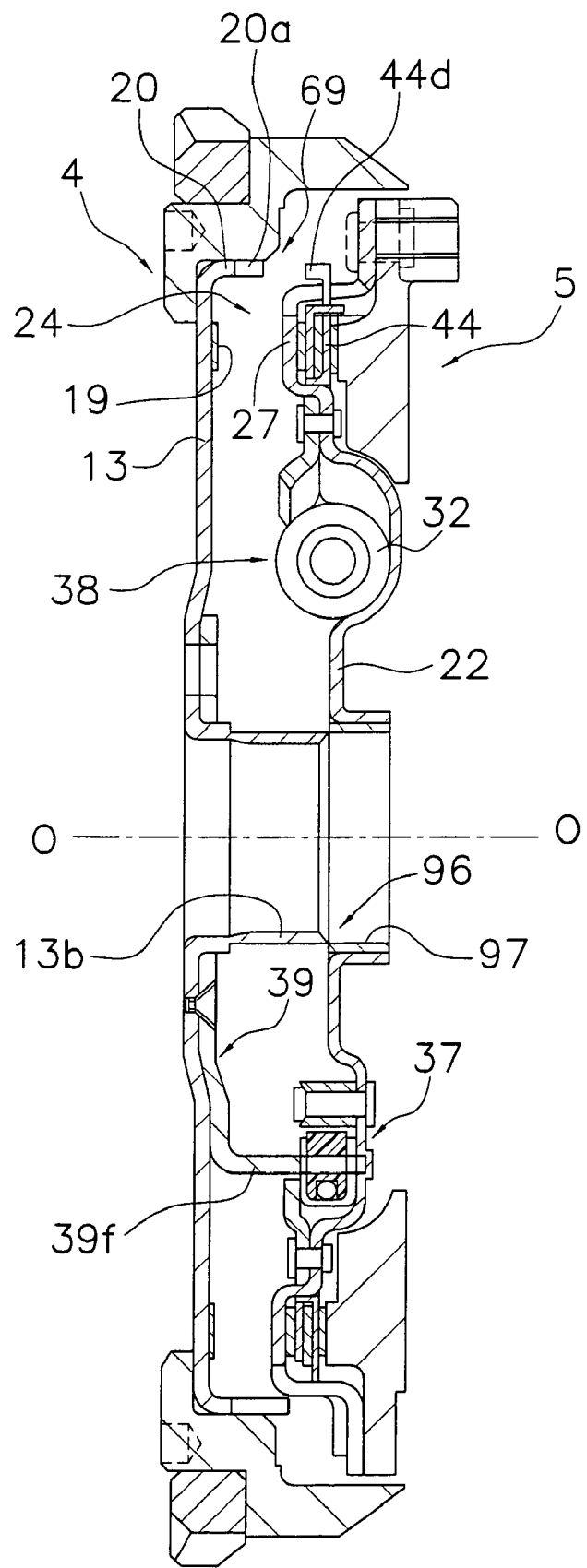
FIG. 31 is vertical cross-sectional view of a first flywheel assembly and a second flywheel assembly of the clutch device in which the flywheel assemblies are separated in the axial direction.

As seen in FIG. 31, the flywheel damper 11 is composed of the first flywheel assembly 4 and the second flywheel assembly 5 such that they can be assembled and disassembled by movement in the axial direction. Engagement portions of both assemblies 4 and 5 are the rotating direction engagement portion 69 (the recesses 20a of the cylindrical portion 20 of the disk-like member 13, and the claw portions 44d of the second friction plate 44), the relative rotation suppressing mechanism 24 (the friction member 19 affixed to the disk-like member 13, and the abutting portion 27 of the disk-like plate 22), the support plate engagement portion 37 (the axial extension 39f of the support plate 39, and the apertures 64a, 65a, and 70a of the spring rotating-direction support mechanism 37), and the rotating direction location determination mechanism 96 (the radially inner cylindrical portion 13b of the disk-like member 13, and the bush 97 fixed to the disk-like plate 22). Every engagement portion can be attached and detached merely by movement of it and its respectively opposing members in the axial direction.

As shown in FIG. 31, the first flywheel assembly 4 and the second flywheel assembly 5 are shown separated in the axial direction. As apparent from the figures, the high rigidity damper 38 (the coil springs 32) and the spring rotating-direction support mechanism 37 (the springs 63) are held by the flywheel 21 and the disk-like plate 22 such that the dampers 37 and 38 cannot be detached from the flywheel 21 and the disk-like plate 22. Accordingly, it is easy to manage and transport the second flywheel assembly 5 as a whole. It also becomes easy to assemble the second flywheel assembly 5 with the first flywheel assembly 4 and disassemble it from the second flywheel assembly 4. Moreover, the frictional resistance generating mechanism 7 is also tightly held by the flywheel 21 and the disk-like plate 22 so that it is easy to manage and transport the second flywheel assembly 5.

In addition, the support plate 39 is engaged with the damper mechanism 6 such that the support plate 39 is attachable to and detachable from the damper mechanism 6, and the cylindrical portion 20 of the disk-like member 13 is engaged with the frictional resistance generating mechanism 7 such that the cylindrical portion 20 is attachable to and detachable from the frictional resistance generating mechanism 7. As a result, it is easy to assemble the second flywheel assembly 5 to the first flywheel assembly 4 and the crankshaft 2.

(3) Other Operations and Effects

The spring rotating-direction support mechanism 37 is located between the coil springs in the rotating direction. Further, the radial position and the radial width of the spring rotating-direction support mechanism 37 are substantially the same with those of the coil springs 32 so that it is not necessary to secure special spaces for the spring rotating-direction support mechanism 37, thereby making the whole structure smaller.

The spring rotating-direction support mechanism 37 has the function of supporting the coil springs 32 in the rotating direction, a first stage low rigidity damper, and a portion to be supported by the support plate 39. As mentioned above, the spring rotating-direction support mechanism 37 has a plurality of functions that are usually conducted by different mechanisms, thus, the number of components is small. Further, the spring rotating-direction support mechanism 37 is only composed of three kinds of components such as the plate 61, the block 62 and the springs 63, thereby reducing the manufacture cost.

The disk-like plate 22 is preferably an integral or unitary disk-like member, and achieves a plurality of structures and functions as described below.

1) The contact portion 27 forms a portion of the relative rotation suppressing mechanism 24.

2) The contact portion 27 holds the frictional resistance generating mechanism 7 on the flywheel 21 having the friction surface, and provides the friction surface of the frictional resistance generating mechanism 7.

3) The spring support portion 29 supports the coil springs 32 in the rotating direction, and supports together with the spring support plate 35 to support the coil springs 32 for preventing disengagement.

4) The radially inner cylindrical portion 31 radially positions the flywheel 21 having the friction surface with respect to the crankshaft 2.

Owing to the combination of the two or more of the foregoing structures, the parts can be reduced in number, and the whole structure can be simplified relative to the prior art.

(4) Other Embodiments

Although the embodiments of the clutch device according to the invention have been described and illustrated, the invention is not restricted to them, and can be variously changed or modified without departing from the scope of the invention.

For example, the clutch cover assembly in the foregoing embodiment is of a push type. However, the invention can be applied to a clutch device including a clutch cover assembly of a pull type.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2003-119045. The entire disclosure of Japanese Patent Application No. 2003-119045 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A clutch device for transmitting and stopping torque from a crankshaft of an engine to a transmission, comprising:
   a flywheel being movable in an axial direction relative to the crankshaft within a certain range, and having a friction surface on an axial side opposite to the engine;
   a damper mechanism being configured to connect elastically said flywheel with the crankshaft, said damper mechanism having elastic members;
   a clutch disk assembly having a frictional connection portion adjacent to said friction surface of said flywheel;
   a clutch cover assembly being attached to said flywheel to bias elastically said frictional connection portion against said friction surface of said flywheel;
   a release device being configured to release the bias toward said frictional connection portion by applying a load to said clutch cover assembly;

a bending direction support mechanism being configured to support elastically said flywheel, said flywheel being movable in a bending direction; and a bending direction movement suppression mechanism being configured to suppress bending movement of said flywheel by connecting said flywheel to a crankshaft side member when said clutch cover assembly receives said load toward the engine in said axial direction, said crankshaft side member having a radially inner cylindrical portion extending in an axial direction being configured to support a radially inner facing surface of a plate attached to said damper mechanism and said flywheel.

2. The clutch device according to claim 1, wherein said bending direction movement suppression mechanism is configured to use said load from said release device to said clutch cover assembly toward the engine in said axial direction to press said flywheel against said crankshaft side member.

3. The clutch device according to claim 2, wherein said flywheel comprises a flywheel main body formed with said friction surface, and a contact member disposed on an axial engine side of said flywheel main body, and further comprising a friction generating mechanism held by said flywheel main body via said contact member, said friction generating mechanism is configured to generate frictional resistance when said flywheel rotates relative to said crankshaft.

4. The clutch device according to claim 3, wherein said contact member has a fix portion fixed to said flywheel main body and a contact portion that contacts said crankshaft side member, and said friction generating mechanism is disposed between said contact portion and said flywheel main body.

5. The clutch device according to claim 1, wherein said flywheel comprises a flywheel main body formed with said friction surface, and a contact member disposed on an axial engine side of said flywheel main body, and further comprising a friction generating mechanism held by said flywheel main body via said contact member, said friction generating mechanism is configured to generate frictional resistance when said flywheel rotates relative to said crankshaft.

6. The clutch device according to claim 5, wherein said contact member has a fix portion fixed to said flywheel main body and a contact portion that contacts said crankshaft side member, and said friction generating mechanism is disposed between said contact portion and said flywheel main body.

7. The clutch device according to claim 6, wherein said contact member further comprises a support portion being configured to support said elastic members of said damper mechanism in said rotational direction.

8. The clutch device according to claim 6, wherein said crankshaft side member contacts said friction generating mechanism.

9. The clutch device according to claim 5, wherein said contact member further comprises a support portion being configured to support said elastic members of said damper mechanism in said rotational direction.

10. The clutch device according to claim 5, wherein said crankshaft side member contacts said friction generating mechanism.

11. The clutch device according to claim 10, wherein said crankshaft side member has an outer periphery fixed to an annular member that extends radially outward and axially toward a transmission side.

12. The clutch device according to claim 1, wherein said crankshaft side member is configured to contact a friction member disposed between said flywheel and said crankshaft side member.

13. The clutch device according to claim 12, wherein said crankshaft side member has an outer periphery fixed to an annular member that extends radially outward and axially toward a transmission side.

14. The clutch device according to claim 1, wherein said flywheel is configured to tilt relative to an original center line that is parallel to an axis of rotation of said clutch device.

15. A clutch device for transmitting and stopping torque from a crankshaft of an engine to a transmission, comprising:

a flywheel being movable in an axial direction relative to the crankshaft within a certain range, and having a friction surface on an axial side opposite to the engine;

a damper mechanism being configured to connect elastically said flywheel with the crankshaft, said damper mechanism having elastic members;

a clutch disk assembly having a frictional connection portion adjacent to said friction surface of said flywheel;

a clutch cover assembly being attached to said flywheel to bias elastically said frictional connection portion against said friction surface of said flywheel;

a release device being configured to release the bias toward said frictional connection portion by applying a load to said clutch cover assembly;

a bending direction support mechanism being configured to support elastically said flywheel, said flywheel being movable in a bending direction; and a bending direction movement suppression mechanism being configured to suppress bending movement of said flywheel by connecting said flywheel to a crankshaft side member when said clutch cover assembly receives said load toward the engine in said axial direction, said bending direction movement suppression mechanism being fixed to the crankshaft and includes said crankshaft side member, said crankshaft side member being a lock member locking to a frictional resistance generating mechanism.

16. The clutch device according to claim 15, wherein said lock member is a disk-like member.

17. The clutch device according to claim 16, wherein said bending direction movement suppression mechanism further includes a friction member disposed between said flywheel and said lock member.

18. The clutch device according to claim 17, wherein said flywheel comprises a flywheel main body formed with said friction surface, and a contact member disposed on an axial engine side of said flywheel main body, and further comprising said friction generating mechanism held by said flywheel main body via said contact member, said friction generating mechanism is configured to generate frictional resistance when said flywheel rotates relative to said crankshaft.

19. The clutch device according to claim 18, wherein said contact member has a fix portion fixed to said flywheel main body and a contact portion that contacts said crankshaft side member, and said friction generating mechanism is disposed between said contact portion and said flywheel main body.

20. The clutch device according to claim 19, wherein said contact member further comprises a support portion being configured to support said elastic members of said damper mechanism in said rotational direction.

* * * * *